(12) United States Patent
Tay

(10) Patent No.: US 8,923,645 B2
(45) Date of Patent: *Dec. 30, 2014

(54) AUTO-FOCUS IMAGE SYSTEM

(71) Applicant: Hiok Nam Tay, Singapore (SG)

(72) Inventor: Hiok Nam Tay, Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 13/909,056

(22) Filed: Jun. 3, 2013

(65) Prior Publication Data

US 2013/0265480 A1 Oct. 10, 2013

Related U.S. Application Data

(63) Continuation of application No. 13/492,802, filed on Jun. 8, 2012, which is a continuation-in-part of application No. PCT/IB2011/052529, filed on Jun. 9, 2011, application No. 13/909,056, which is a continuation-in-part of application No. 12/961,826, filed on Dec. 7, 2010, now Pat. No. 8,457,431.

(60) Provisional application No. 61/267,436, filed on Dec. 7, 2009.

(51) Int. Cl.
| | |
|---|---|
| *G06K 9/40* | (2006.01) |
| *G03B 13/00* | (2006.01) |
| *G03B 13/36* | (2006.01) |
| *H04N 5/232* | (2006.01) |
| *G02B 7/36* | (2006.01) |

(52) U.S. Cl.
CPC ............ *H04N 5/23212* (2013.01); *G03B 13/36* (2013.01); *G02B 7/36* (2013.01)
USPC ............................................ 382/255; 348/349

(58) Field of Classification Search
CPC ....... G03B 13/36; H04N 5/23212; G02B 7/36
USPC .................................. 382/255; 348/345, 349
See application file for complete search history.

(56) References Cited

U.S. PATENT DOCUMENTS 8,264,591 B2 * 9/2012 Yeo et al. ...................... 348/345

* cited by examiner

*Primary Examiner* — Kanjibhai Patel

(57) ABSTRACT

An auto-focus image system that includes a pixel array coupled to a focus signal generator. The pixel array captures an image that has a plurality of edges. The generator generates a focus signal that is a function of a plurality of edge-sharpness measures, each being measured from a different one of the plurality of edges. The edge-sharpness measure is a quantity that has a unit that is a power of a unit of length. It may be a distance in the edge. It may be an area. It may be a central moment. The generator may reduce a relative extent to which an edge contributes to the focus signal on basis of detecting that the edge does not have sufficient reflection symmetry in a sequence of gradients of an image signal across the edge according to a predefined criterion. The edge may be prevented from contributing altogether.

4 Claims, 21 Drawing Sheets

|    | C1 | C2 | C3 | C4 | C5 | C6 |
|----|----|----|----|----|----|----|
| R1 | 10<br>9 V | 10<br>10 V | 10<br>9 V | 2<br>0 | 0<br>0 | 0<br>0 |
| R2 | 3<br>0 | 10<br>8 V | 10<br>11 V | 9<br>10 V | 1<br>0 | 0<br>0 |
| R3 | 1<br>0 | 3<br>1 | 8<br>8 V | 9<br>11 V | 7<br>8 V | 1<br>0 |
| R4 | 0<br>0 | 1<br>0 | 3<br>2 | 7<br>8 V | 8<br>10 V | 7<br>8 V |
| R5 | 0<br>-2 | 0<br>0 | 1<br>1 | 3<br>3 | 7<br>12 H | 6<br>12 H |
| R6 | 0<br>-1 | 0<br>-1 | 0<br>0 | 1<br>2 | 3<br>0 V | 1<br>8 H |

$b = a\cos\phi$ corrects edge width for slant angle $\phi$
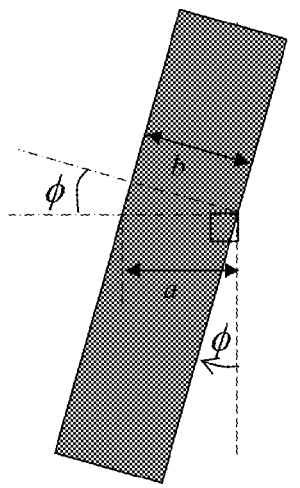
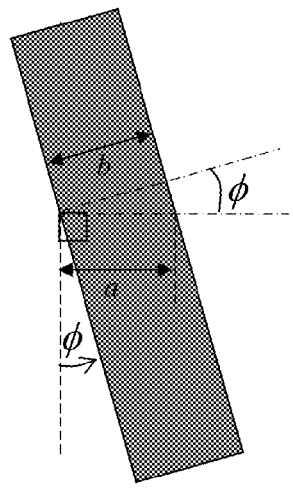
FIG. 6A          FIG. 6B
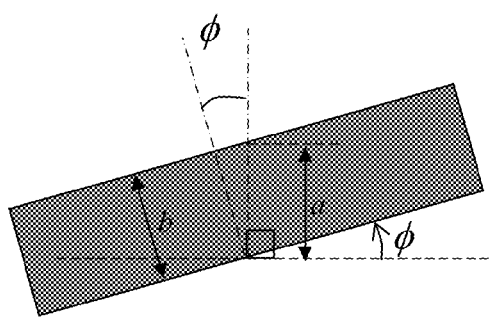
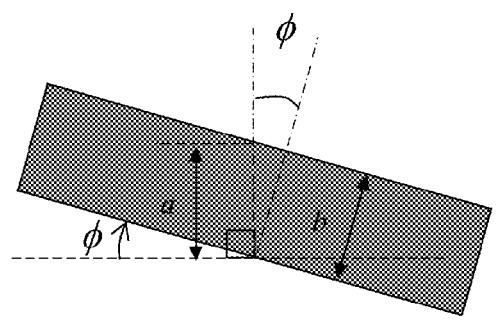
FIG. 6C          FIG. 6D

|    | C1      | C2       | C3        | C4        | C5       | C6       |
|----|---------|----------|-----------|-----------|----------|----------|
| R1 | 0  6 H  | 5  10 H  | 1  3      | 2  0      | 0  0     | 0  0     |
| R2 | 3  0    | 8  8 H   | 15  11 V  | 19  10 V  | 1  0     | 0  0     |
| R3 | 1  0    | 3  1     | 18  8 V   | 19  11 V  | 17  8 V  | 1  0     |
| R4 | 0  0    | 1  0     | 3  2      | 17  8 V   | 18  10 V | 7  3 H   |
| R5 | 0  2    | 0  0     | 1  1 V    | 3  3      | 7  12 H  | 6  12 H  |
| R6 | 0  1    | 0  1     | 0  0      | 1  2      | 3  0     | 1  8 H   |

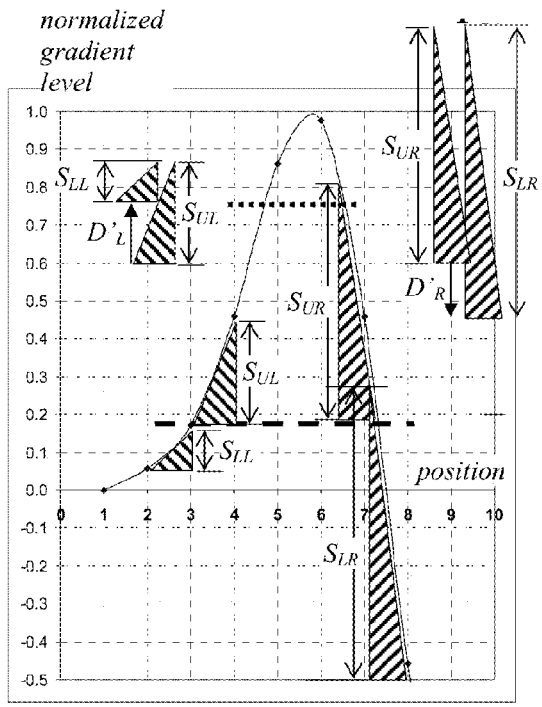
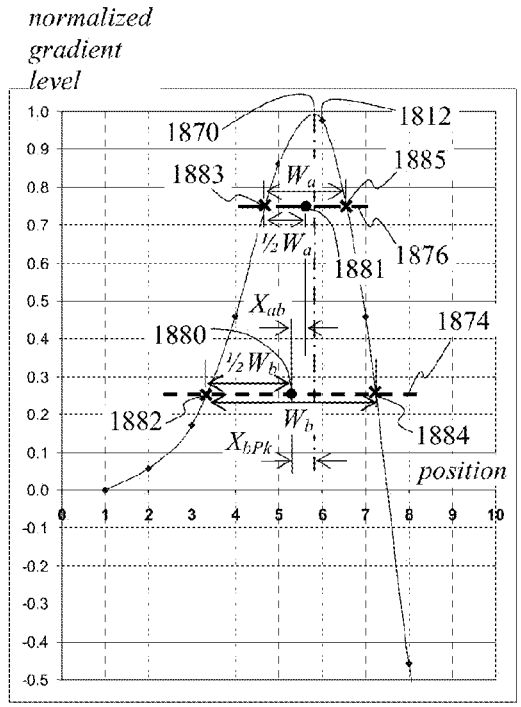
FIG. 24G
FIG. 24H
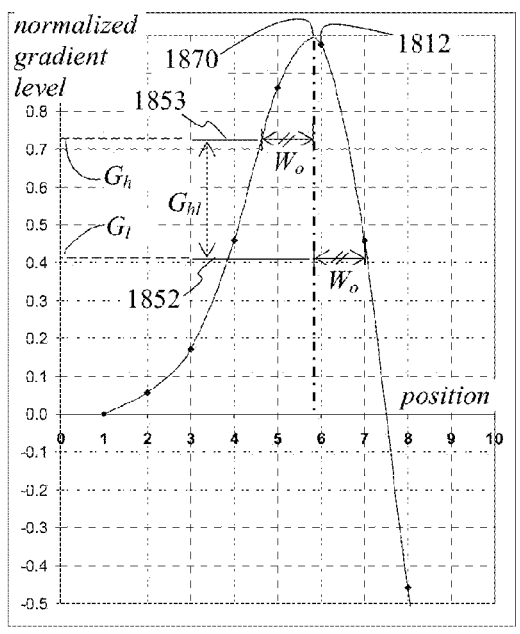
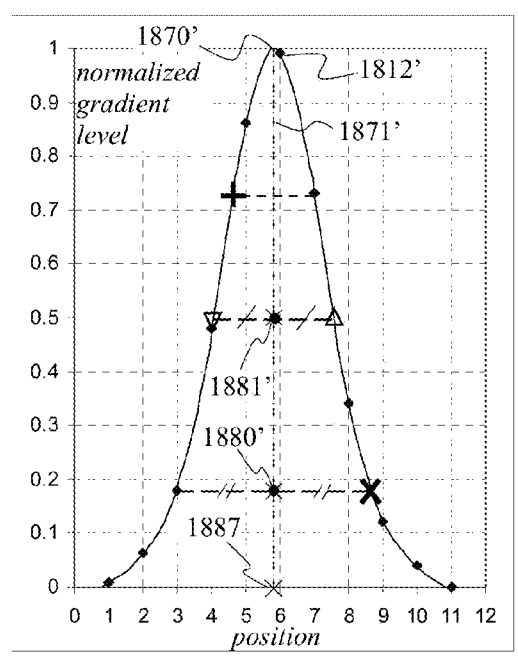
FIG. 24I
FIG. 24J

AUTO-FOCUS IMAGE SYSTEM

CROSS-REFERENCE TO RELATED APPLICATIONS

This application is a continuation of U.S. patent application Ser. No. 13/492,802 filed on Jun. 8, 2012, which is a continuation-in-part of International Patent Application No. PCT/IB2011/052529 filed on Jun. 9, 2011.

BACKGROUND OF THE INVENTION

1. Field of the Invention

The subject matter disclosed generally relates to auto-focusing electronically captured images.

2. Background Information

Photographic equipment such as digital cameras and digital camcorders may contain electronic image sensors that capture light for processing into still or video images, respectively. Electronic image sensors typically contain millions of light capturing elements such as photodiodes.

Many image capturing devices such as cameras include an auto-focusing system. The process of auto-focusing includes the steps of capturing an image, processing the image to determine whether it is in focus, and if not, generating a feedback signal that is used to vary a position of a focus lens ("focus position"). There are two primary auto-focusing techniques. The first technique involves contrast measurement, the other technique looks at a phase difference between a pair of images. In the contrast method the intensity difference between adjacent pixels is analyzed and the focus is adjusted until a maximum contrast is detected. Although acceptable for still pictures, the contrast technique is not suitable for motion video.

The phase difference method includes splitting an incoming image into two images that are captured by separate image sensors. The two images are compared to determine a phase difference. The focus position is adjusted until the two images match. The phase difference method requires additional parts such as a beam splitter and an extra image sensor.

Additionally, the phase difference approach analyzes a relatively small band of fixed detection points. Having a small group of detection points is prone to error because noise may be superimposed onto one or more points. This technique is also ineffective if the detection points do not coincide with an image edge. Finally, because the phase difference method splits the light the amount of light that impinges on a light sensor is cut in half or even more. This can be problematic in dim settings where the image light intensity is already low.

BRIEF SUMMARY OF THE INVENTION

An auto-focus image system that includes a pixel array coupled to a focus signal generator. The pixel array captures an image that has a plurality of edges. The generator generates a focus signal that is a function of a plurality of edge-sharpness measures, each being measured from a different one of the plurality of edges. The edge-sharpness measure is a quantity that has a unit that is a power of a unit of length. It may be a distance in the edge. It may be an area. It may be a central moment. The generator may reduce a relative extent to which an edge contributes to the focus signal on basis of detecting that the edge does not have sufficient reflection symmetry in a sequence of gradients of an image signal across the edge according to a predefined criterion. The edge may be prevented from contributing altogether.

BRIEF DESCRIPTION OF THE DRAWINGS

FIG. 6A, 6B are illustrations of a calculation of an edge width of a vertical edge having a slant angle φ;

FIG. 6C, 6D are illustrations of a calculation of an edge width of a horizontal edge having a slant angle φ;

FIG. 24G shows the positive gradients from FIG. 23B and illustrates a alternative method for estimating the second derivative;

FIG. 24H shows the positive gradients from FIG. 23B and illustrates a distance between midpoints at different gradient levels and between each midpoint and the interpolated peak;

FIG. 24I shows the positive gradients from FIG. 23B and illustrates two gradients at a common distance from the interpolated peak;

FIG. 24J shows a symmetric gradient profile and coinciding midpoints and interpolated peak;

DETAILED DESCRIPTION

Disclosed is an auto focus image system that includes a pixel array coupled to a focus signal generator. The pixel array captures an image that has at least one edge with a width. The focus signal generator may generate a focus signal that is a function of the edge width and/or statistics of edge widths. An auto focus image system that includes a pixel array coupled to a focus signal generator. The pixel array captures an image that has at least one edge with a width. The generator generates a focus signal that is a function of the edge width and various statistics of edge width. The generator may eliminate an edge having an asymmetry of a gradient of an image signal. The generator may also eliminate an edge that fails a template for an associated peaking in the gradient. A processor receives the focus signal and/or the statistics of edge widths and adjusts a focus position of a focus lens. The edge width can be determined by various techniques including the use of gradients. A histogram of edge widths may be used to determine whether a particular image is focused or unfocused. A histogram with a large population of thin edge widths is indicative of a focused image.

Architecture

Figure 1:
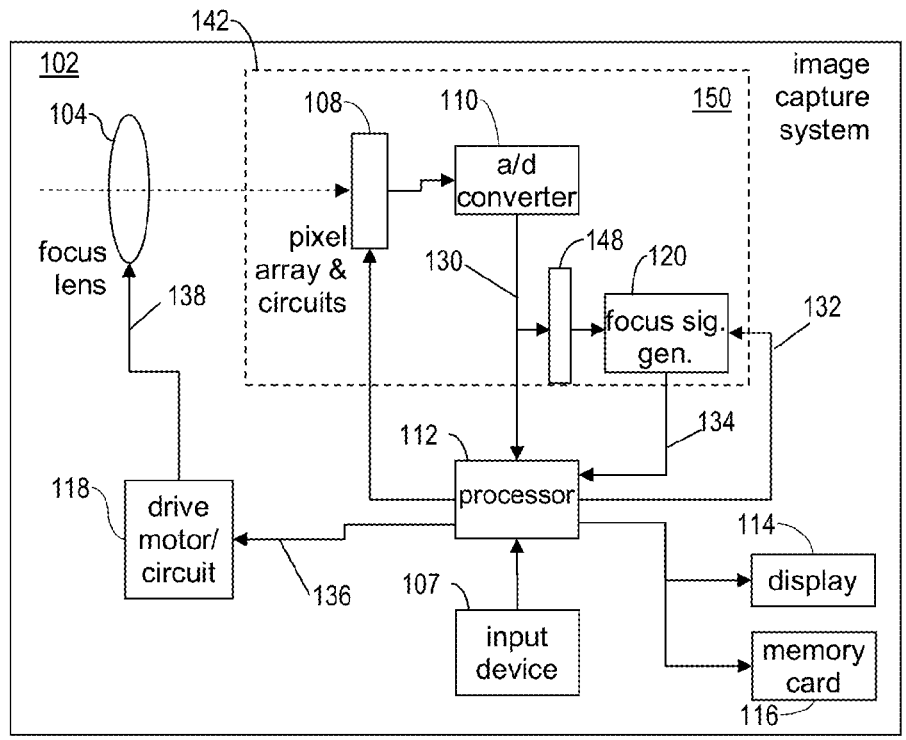
FIG. 1 is a schematic of an embodiment of an auto-focus image pickup apparatus.
Figure 2:
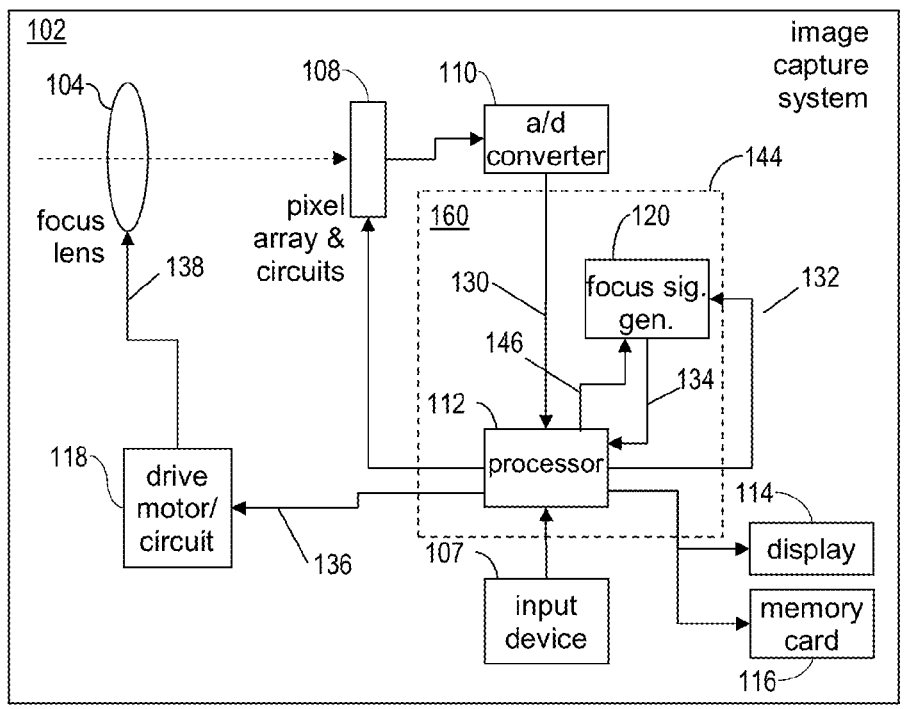
FIG. 2 is a schematic of an alternate embodiment of an auto-focus image pickup apparatus.

Referring to the drawings more particularly by reference numbers, FIG. 1 shows an embodiment of an auto-focus image capture system 102. The system 102 may be part of a digital still camera, but it is to be understood that the system can be embodied in any device that requires controlled focusing of an image. The system 102 may include a focus lens 104, a pixel array and circuits 108, an A/D converter 110, a processor 112, a display 114, a memory card 116 and a drive motor/circuit 118. Light from a scene enters through the lens 104. The pixel array and circuits 108 generates an analog signal that is converted to a digital signal by the A/D Converter 110. The pixel array 108 may incorporate a mosaic color pattern, e.g. the Bayer pattern. The digital signal may be sent to the processor 112 that performs various processes, e.g. color interpolation, focus position control, color correction, image compression/decompression, user interface control, and display control, and to the focus signal generator 120. Where the focus signal generator 120 and the processor 112 reside within different packages, a color interpolation unit 148 may be implemented to perform color interpolation on the digital signal 130 to estimate the missing color signals on each pixel for the focus signal generator 120. Alternately, where the focus signal generator 120 and the processor 112 reside together within a package 144, the focus signal generator 120 may input interpolated color images from the processor 112 on bus 146 as shown in FIG. 2 or a single image signal derived from the original image signal generated from the A/D converter 110, for example a grayscale signal.

The focus signal generator 120 receives a group of control signals 132 from the processor 112, in addition, and may output signals 134 to the processor 112. The output signals 134 may comprise one or more of the following: a focus signal 134, a narrow-edge count, and a set of numbers representing a statistics of edge width in the image. The processor 112 may generate a focus control signal 136 that is sent to the drive motor/circuit 118 to control the focus lens 104. A focused image is ultimately provided to the display 114 and/or stored in the memory card 116. The algorithm(s) used to adjust a focus position may be performed by the processor 112.

The pixel array and circuits 108, A/D Converter 110, focus signal generator 120, and processor 112 may all reside within a package. Alternately, the pixel array and circuits 108, A/D Converter 110, and focus signal generator 120 may reside within a package 142 as image sensor 150 shown in FIG. 1, separate from the processor 112. Alternately, the focus signal generator 120 and processor 112 may together reside within a package 144 as a camera controller 160 shown in FIG. 2, separate from the pixel array 108 and A/D Converter 110. The focus signal generator 120 (or any alternative embodiment, such as one shown in FIG. 30) and the processor 112 may together reside on a semiconductor substrate, such as a silicon substrate.

Focus Signal Generator

Figure 3:
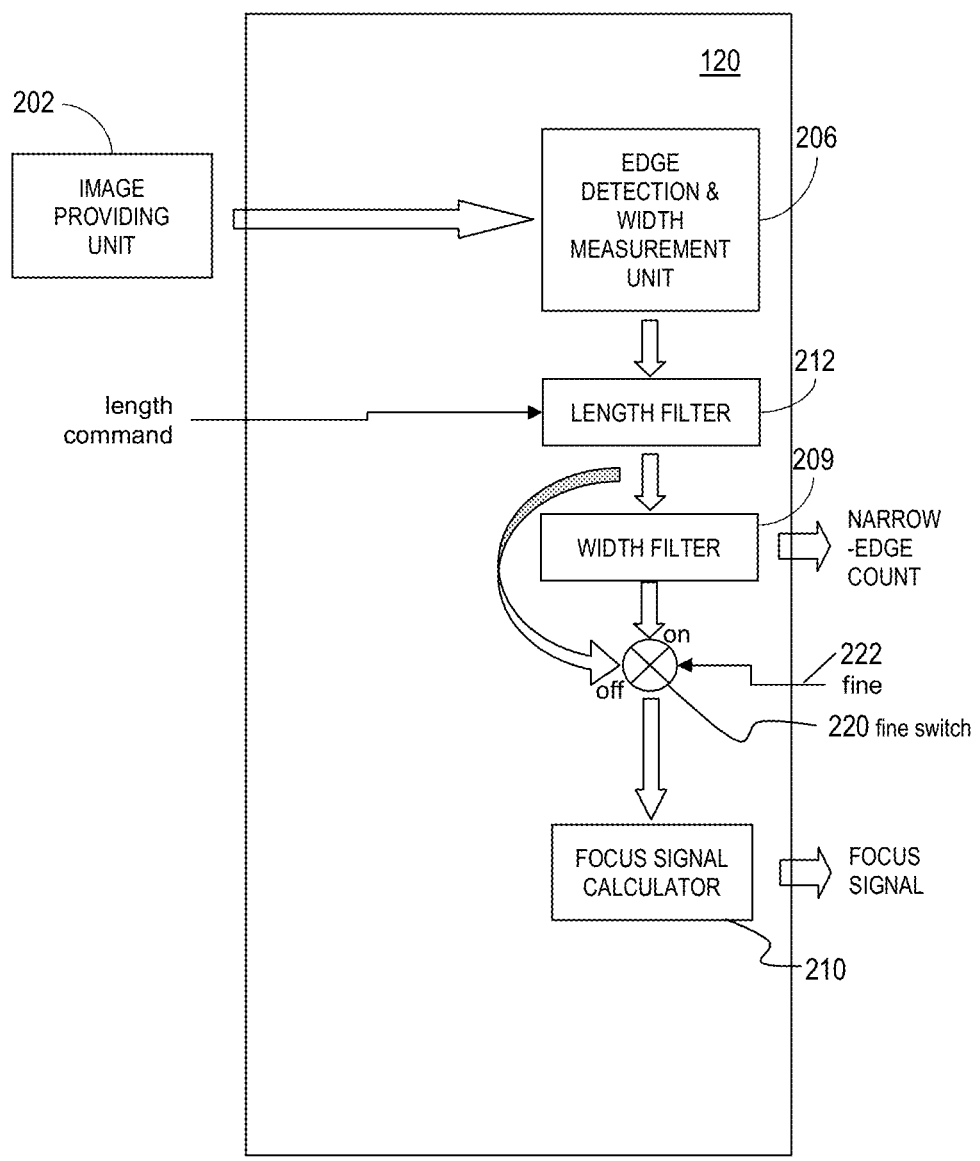
FIG. 3 is a block diagram of a focus signal generator.

FIG. 3 shows an embodiment of a focus signal generator 120 receiving image(s) from a image providing unit 202. The image providing unit 202 may be the color interpolator 148 in FIG. 1 or the processor 212 in FIG. 2. The focus signal generator 120 may comprise an edge detection & width measurement (EDWM) unit 206, a focus signal calculator 210, a length filter 212, and a width filter 209. It may further comprise a fine switch 220 controlled by input 'fine' 222. The focus signal generator 120 may provide a narrow-edge count from the width filter 209 and a focus signal from the focus signal calculator 210, the focus signal being configurable between a fine focus signal and a gross focus signal, selectable by input 'fine' 222. Alternately, both fine focus signal and gross focus signal may be calculated and output as part of output signals 134. The edge detection & width measurement unit 206 receives image(s) provided by the image providing unit 202. In the context of FIGS. 1 and 2, control signals, such as control signal 'fine' 222, may be provided by the processor 112 in signals 132. Also in the context of FIGS. 1 and 2, the output signals 134 may be provided to the processor 112, which functions as a focus system controller that controls the focus position of the focus lens 104 to bring images of objects into sharp focus on the pixel array 108 by analyzing the output signals 134 to detect a sharp object in the image. Various components of the focus signal generator 120 are described below.

The EDWM unit 206 may transform the input image such that the three signals of the image, red (R), green (G) and blue (B) are converted to a single image signal. Several techniques can be utilized to transform an image to a single image. RGB values can be used to calculate a luminance or chrominance value or a specific ratio of RGB values can be taken to form the single image signal. For example, the luminance value can be calculated with the equation $Y=0.2126*R+0.7152*G+0.0722*B$, where Y is luminance value. The single image signal may then be processed by a Gaussian filter or any lowpass filter to smooth out image data sample values among neighboring pixels to remove a noise.

The focus signal generator 120, 120', 120" is not limited to grayscale signal. It may operate on any one image signal to detect one or more edges in the image signal. Or it may operate on any combination of the image signals, for example Y, R-G, or B-G. It may operate on each and every one of the R, G, B image signals separately, or any one or more combinations thereof, to detect edges. It may form statistics of edge widths for each of the R, G, B image signals, or any combination thereof. It may form a focus signal from statistics of edge widths from one or more image signals.

The focus signal generator includes an edge detector to identify an edge in an image signal. The edge detector may use a first-order edge detection operator, such as Sobel operator, Prewitt operator, Roberts Cross operator, or Roberts operator. The edge detector may use a higher-order edge detection operator to identify the edge, for example a second order operator such as a Laplacian operator. The edge detector may use any one of the known edge detection operators or any improved operator that shares a common edge detection principle of any of the known operators.

Where the edge detector uses a first-order edge detection operator, a gradient (i.e. first derivative) of the image signal is computed. There are various methods available to calculate the gradient, including using any one of various first order edge detection operators such the Sobel operator, the Prewitt operator, the Roberts Cross operator, and the Roberts operator. The Roberts operator has two kernels which are single column or single row matrices: [−1 +1] and its transpose. The Roberts Cross operator has two kernels which are 2-by-2 matrices: [+1, 0; 0, −1] and [0, +1; −1, 0], shown in the format of [<first-row vector; second-row vector; third-row vector] like in Matlab. The Prewitt and the Sobel operator are basically have the same kernels, [−1, 0, +1] taking gradient in a direction of the row and its transpose taking gradient in a direction of the column, further multiplied by different lowpass filter kernels performing lowpass filterings perpendicular to the respective gradient directions. Gradients across the columns and the rows may be calculated to detect vertical and horizontal edges respectively, for example using a Sobel-X operator and a Sobel-Y operator, respectively. Sobel X-operator at pixel location [k, q] where k is a row number and q is a column number, is given by the equation $Sx[k, q]=U[k, q+1]-U[k, q-1]$. Sobel Y-operator at the same location is given by the equation $Sy[k,q]=U[k+1,q]-U[k-1,q]$, where U is an image signal of the processed image.

Where the edge detector uses a second-order operator, a second derivative (such as the Laplacian) of the image signal is computed.

Orientation Tagging

Figures 4, 5:
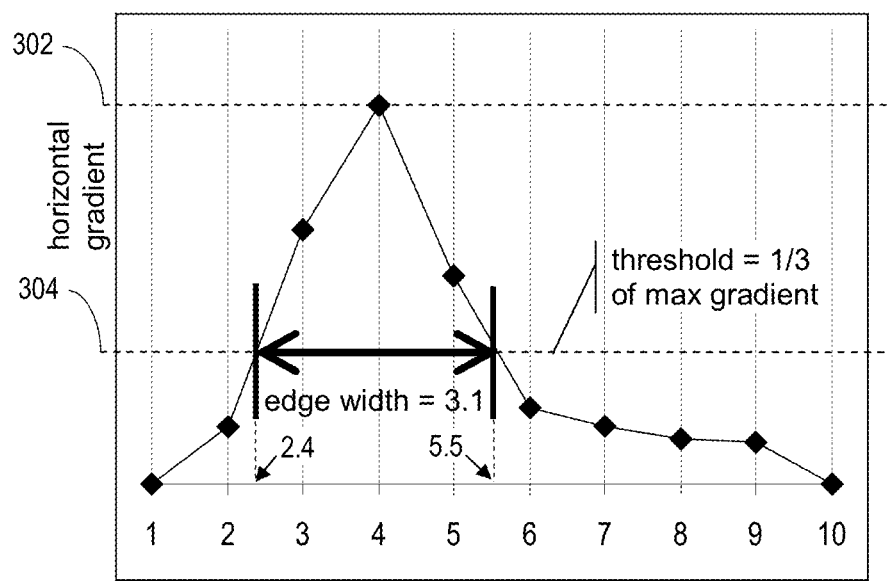
FIG. 4 is an illustration of a horizontal Sobel operator's operation on a image signal matrix.
FIG. 5 illustrates a calculation of edge width from a horizontal gradient.

Each pixel may be tagged either a horizontal edge ('H') or a vertical edge ('V') if either vertical or horizontal gradient magnitude exceeds a predetermined lower limit ("elimination threshold"), e.g. 5 for an 8-bit image, or no edge if neither is true. This lower limit eliminates spurious edges due to gentle shading or noise. A pixel may be tagged a vertical edge if its horizontal gradient magnitude exceeds its vertical gradient magnitude by a predetermined hysteresis amount or more, e.g. 2 for an 8-bit image, and vice versa. If both gradient magnitudes differ less than the hysteresis amount, the pixel gets a direction tag same as that of its nearest neighbor that has a direction tag already determined. For example, if the image is scanned from left to right in each row and from row to row downwards, a sequence of inspection of neighboring pixels may be the pixel above first, the pixel above left second, and the pixel on the left third, and the pixel above right last. Applying this hysteresis helps to ensure that adjacent pixels get similar tags if each of them has nearly identical horizontal and vertical gradient magnitudes. FIG. 4 illustrates the result of tagging on a 6-by-6 array of horizontal and vertical gradients. In each cell, the horizontal gradient is in the upper-left, vertical gradient is on the right, and direction tag is at the bottom. Only pixels that have either horizontal or vertical gradient magnitude exceeding 5 qualify at this step as edge pixels are printed in bold and get direction tags.

The image, gradients and tags may be scanned horizontally for vertical edges, and vertically for horizontal edges. Each group of consecutive pixels in a same row, having a same horizontal gradient polarity and all tagged for vertical edge may be designated a vertical edge if no adjacent pixel on left or right of the group are likewise. Likewise, each group of consecutive pixels in a same column having a same vertical gradient polarity and all tagged for horizontal edge may be designated a horizontal edge if no adjacent pixel above or below the group satisfies the same. Thus horizontal and vertical edges may be identified.

Edge Width

Each edge may be refined by removing pixels whose gradient magnitudes are less than a given fraction of the peak gradient magnitude within the edge. FIG. 5 illustrates this step using a refinement threshold equal to one third of the edge's peak gradient magnitude, refining the edge width down to 3 from the original 9. This edge refinement distinguishes the dominant gradient component that sets the apparent edge width that dominates visual perception of the edge's sharpness despite an image having multiple overlapping shadings that may cause gradients to gently decay over many pixels.

Edge width may be calculated in any one of known methods. One method of calculating edge width is simply counting the number of pixels within an edge. An alternate method of calculating edge width is shown in FIG. 5. In FIG. 5, a first fractional pixel position (2.4) is found between a first outer pixel (pixel 3) of a refined edge and the adjacent outside pixel (pixel 2) by an interpolation from the refinement threshold 304. Likewise, a second fractional pixel position (5.5) is found between a second outer pixel (pixel 5) and its adjacent outside pixel (pixel 6). The edge width is found as the difference between these two fractional pixel positions, 5.5−2.4=3.1.

Another alternative edge width calculation method is to calculate a difference of the image signal across the edge (with or without edge refinement) and divide it by a peak gradient of the edge.

Alternatively, edge width may be a distance between a pair of positive and negative peaks (or interpolated peak(s)) of the second order derivative of the image signal across the edge. Other alternatives are possible, to be described under the heading "edge-sharpness measure" further into this specification.

It will be seen further into this specification under the heading "edge-sharpness measure" that there are other alternatives than a width, which is merely one example of a edge-sharpness measure that is essentially independent of illumination of the scene.

Slant Correction

Although each edge may be assigned to one prescribed direction (e.g. vertical direction or horizontal direction) or another, perpendicular, prescribed direction (e.g horizontal direction or vertical direction) and may have its edge width measured in a direction perpendicular to that assigned edge direction, the boundaries between regions of different image signal values in the image from which these edges arise may not be and usually are not aligned perfectly with either prescribed directions. In FIG. 6A, a boundary (shaded band) is shown to be inclined at a slant angle $\phi$ with respect to the vertical dashed line, and a width a is shown to be measured in the perpendicular direction (i.e. horizontal direction). However, a width b (as indicated in the drawing) measured in a direction perpendicular to the direction of the boundary (also direction of an edge that forms a part of the boundary) is more appropriate as the width of the boundary (and also of the edge) than width a. Such widths a that are not measured perpendicularly to the respective edge directions tend to be too large and do not represent the genuine thickness of the respective boundaries.

For purposes of calculating a focus signal from edge widths, the edge widths measured in one or the other of those prescribed directions are to be corrected by reducing them down to be widths in directions perpendicular to directions of the respective edges. The Edge Detection and Width Measurement Unit 206 performs such a correction on edge widths. As shown in FIG. 6A, the measured width a is the length of the hypotenuse of a right-angled triangle that has its base (marked with width b) straddling across the shaded boundary perpendicularly (thus perpendicular to the edge direction) and that has the angle $\phi$. The corrected width b may then be obtained from a projection of the measured width a to the direction perpendicular to the edge direction. From elementary trigonometry, such a projection may be given by $b=a\cos(\phi)$, but approximation may be used as long as it obtains accuracy to within 20%. The angle $\phi$, or $\cos(\phi)$ itself, may be found by any method known in the art for finding a direction of an edge in an image, or by a more accurate method described in the flowchart shown in FIG. 7.

Each horizontal or vertical edge's edge width may be corrected for its slant from either the horizontal or vertical orientation (the prescribed directions), respectively. FIG. 6A, 6B illustrate a correction calculation for an edge width measured in the horizontal direction for a boundary (and hence edges that form the boundary) that has a slant from the vertical line. FIG. 6C, 6D illustrate a correction calculation for an edge width measured in the vertical direction for a boundary (and hence edges that form the boundary) that has a slant from the horizontal line. The correction may be made by multiplying the edge width measured in a prescribed direction, such as a vertical direction or a horizontal direction, by a factor of $\cos\phi$, where $\phi$ is an angle of slant from the prescribed direction.

Figures 7, 8:
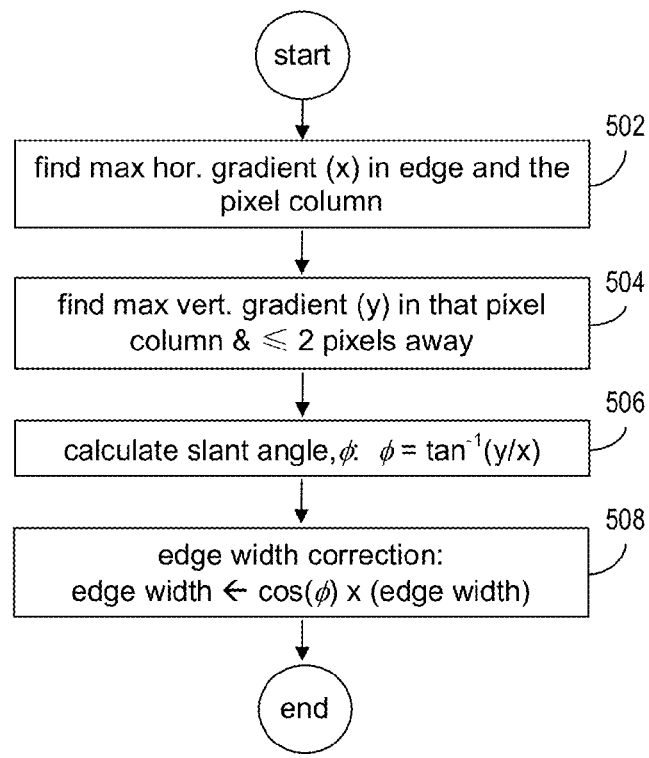
FIG. 7 is a flowchart of a process to calculate a slant angle φ and correct an edge width for a vertical edge having a slant.
FIG. 8 is an illustration of a vertical concatenated edge.

By way of example, FIG. 7 shows a flowchart of a process to correct edge widths for slant for edges inclined from a vertical line. (For horizontal edges, substitute 'row' for 'column', and interchange 'vertical' with 'horizontal' in the flowchart.)

From step 502 to step 506, a slant angle $\phi$ is found. For each vertical edge, at step 502, locate the column position where the horizontal gradient magnitude peaks, and find the horizontal gradient x. At step 504, find where the vertical gradient magnitude peaks along the column position and within two pixels away, and find the vertical gradient y.

At step 506, find the slant angle $\phi=\tan^{-1}(y/x)$. At step 506, the slant angle may be found by looking up a lookup table. Although steps 502 to 506 present one specific procedure and method to find the slant angle, other procedures and methods known in the art may be used instead.

Finally, at step 508, scale down the edge width by multiplying with $\cos(\phi)$, or with an approximation thereto as one skilled in the art usually does in practice.

A first modification of the process shown in FIG. 7 is to substitute for step 506 and part of step 508 by providing a lookup table that has entries for various combinations of input values of x and y. For each combination of input values of x and y, the lookup table returns an edge width correction factor. The edge width correction factor output by the lookup table may be an approximation to $\cos(\tan^{-1}(y/x))$ to within 20%, preferably within 5%. The edge width is then multiplied with this correction factor to produce a slant-corrected edge width.

A second modification is to calculate a quotient y/x between a vertical gradient y and a horizontal gradient x to produce a quotient q, then use q to input to a lookup table that has entries for various values of q. For each value of q, the lookup table returns an edge width correction factor. The edge width correction factor may be an approximation to $\cos(\tan^{-1}(q))$ to within 20%, preferably within 5%.

For finding the slant angle $\phi$ (or an approximation thereto such that the correction factor is accurate to within 20%) and subsequently the correction factor $\cos(\phi)$ (or an approximation thereto), or to directly find the correction factor without finding the slant angle $\phi$ (as in the first and second modifications), the values of x and y may be obtained in steps 502 to 506, but other methods may be employed instead.

A third modification is to perform the following for each one of a plurality of pixels in the edge: (a) find horizontal gradient x and vertical gradient y both for a pixel, (b) find $q=y/x$ for this pixel, and (c) find a correction factor that corresponds to q, for instance $\cos(\tan^{-1}(q))$ or an approximation thereto to within 20%. Finally, find the correction factor for the edge width by averaging across the correction factor from each of the plurality of pixels. The average may be a weighted average, such as one in which a pixel that has a larger horizontal gradient is given a larger weight than another pixel that has a lesser horizontal gradient.

Other modifications are possible along these directions or other.

Screen Threshold

Figure 9A:
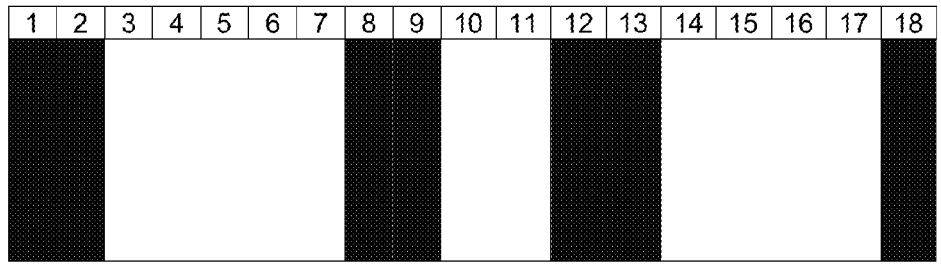
FIG. 9A is an illustration of a group of closely-packed vertical bars.
Figure 9B:
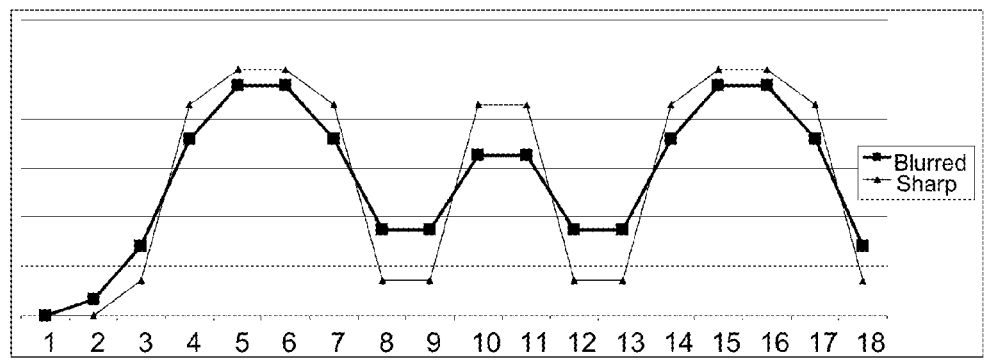
FIG. 9B is a graph of an image signal across FIG. 9A.
Figure 9C:
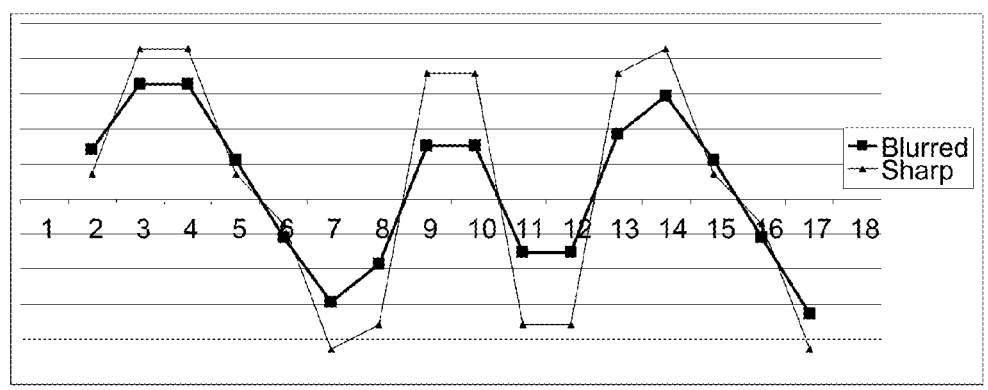
FIG. 9C is a graph of a horizontal Sobel gradient across FIG. 9A.

Adjacent edges may be prevented altogether from contributing to a focus signal, or have their contributions attenuated, if their peak gradient magnitudes are below a predetermined fraction of an adjacent wider edge's peak gradient magnitude. FIGS. 9A, 9B, and 9C illustrate a problem that is being addressed.

FIG. 9A illustrates three vertical white bars separated by two narrow black spaces each 2 pixels wide. The middle white bar is a narrow bar 2 pixels wide. FIG. 9B shows an image signal plotted horizontally across the image in FIG. 9A for each of a sharp image and a blurred image. FIG. 9C plots Sobel-x gradients of FIG. 9B for the sharp image and blurred image. In FIG. 9C, the first edge (pixels 2-5) for the blurred image is wider than that for the sharp image, and likewise the last edge (pixels 13-15) as expected. However, the two narrowest edges (pixels 9 & 10, and pixels 11 & 12) have widths of two in both images. In FIG. 9B, the corresponding slopes at pixels 9 & 10, and pixels 11 & 12, each takes two pixels to complete a transition. The blurred image, however, has a significant decline of peak gradient magnitude, as much as 50%, from the wider edge to the narrower edges. The sharp image, on the other hand, changes less than 10% between the wider and the narrower edges.

The significant decline, e.g. 20% or greater, in peak gradient magnitude for a narrower edge adjacent to a wider edge having an opposite-signed gradient gives a hint that the blurred image is not well focused, and thus the narrower edge should not be relied upon as an indication that the blurred image is sharp.

Likewise, mutually adjacent edges of alternating gradient polarities should not be relied upon for such indication even if their edge width are small as long as they are in close proximity to each other, e.g. no more than 1 pixel apart ("minimum edge gap"). The minimum edge gap is in terms of a number of pixels, e.g. 1, or 2, or in between.

Furthermore, given that one edge may have been eliminated due to having a peak gradient less than the elimination threshold, two successive edges having an identical gradient polarity and spaced no more than two times the minimum edge gap plus a sharp_edge_width (sharp_edge_width is a number assigned to designate an edge width of a sharp edge) apart may be used as a condition for eliminating or demoting a contribution from one or both of the two mutually adjacent edges. either.

The Edge Detection and Width Measurement Unit 206 may execute the following algorithm for eliminating closely-packed narrower edges based on a screen threshold established from a wider edge, and a modulation screen flag that can be turned on and off.

Figure 10:
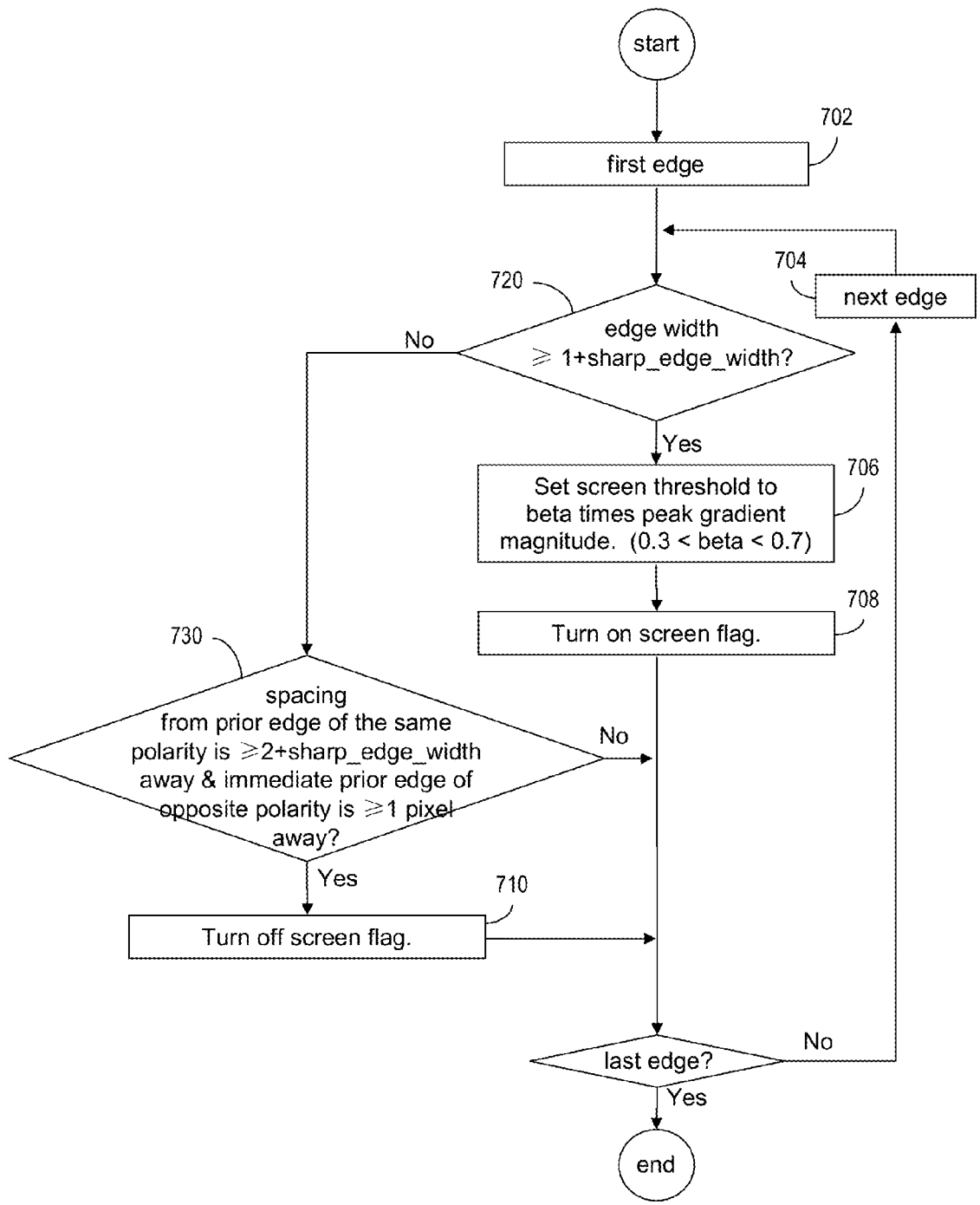
FIG. 10 is a flowchart of a process to eliminate closely-packed edges having shallow depths of modulation.

For each edge, the screen threshold and screen flag to be used for the immediate next edge of an opposite polarity are determined according to the process of the flowchart shown in FIG. 10.

Given the screen threshold and screen flag, an edge may be eliminated unless one of the following conditions is true: (a) the screen flag is off for this edge, (b) a peak gradient magnitude of the edge is not smaller than the screen threshold for this edge. To conditions (a) and (b) may be added condition (c) the edge width is not less than sharp_edge_width+1, where a number has been assigned for sharp_edge_width to designate an edge width of a sharp edge, and where the "+1" may be varied to set a range of edge widths above the sharp_edge_width within which edges may be eliminated if they fail (a) and (b). For the example shown in FIGS. 9A-9C, sharp_edge_width may be 2. FIG. 10 is a flowchart to determine a screen threshold and a screen flag for each edge. For vertical edges, assume scanning from left to right along a row, though this is not required. (For horizontal edges, assume scanning from top to bottom along a column, though this is not required.) A number is assigned for sharp_edge_width and may be 2 for the example shown in FIGS. 9A-9C. Starting at the first edge at step 702, each edge is queried at step 720 as to whether its edge width is greater than or equal to one plus sharp_edge_width, the value of one being the minimum edge gap value used for this illustration, but a different value may be used, such as between 0.5 and 2.0. If yes, the edge is a wider edge, and step 706 follows to set the screen threshold for the immediate next edge that has an opposite polarity to beta times a peak gradient magnitude of the edge, beta being from 0.3 to 0.7, preferably 0.55, then step 708 follows to turn on the screen flag for the next edge, then proceed to the next edge. If no, the edge is not a wider edge, and step 730 follows to check whether the spacing from the prior edge of the same gradient polarity is greater than two times the minimum edge gap (or a different predetermined number) plus sharp_edge_width and the immediate prior edge of an opposite polarity, if any, is more than the minimum edge gap away. If yes, step 710 follows to turn off the screen flag for the next edge. If no, keep the screen flag and the screen threshold for the next edge and proceed to the next edge. Beta may be a predetermined fraction, or it may be a fraction calculated following a predetermined formula, such as a function of an edge width. In the latter case, beta may vary from one part of the image to another part.

Alternative Embodiments

Orientation of the Pixel Grid:

The image input by the focus signal generator 120 may have pixels laid out in a rectangular grid ("pixel grid") rotated at 45 degrees with respect to a rectangular frame of the image. In this case, the X- and Y-directions of the edge detection operations and width measurement operations may be rotated likewise.

Edge-Sharpness Measures:

In the above description, sharpness of image of an edge is represented by a width of the edge measured from a sequence of gradients across the edge with the gradients oriented across the edge, there are alternatives that work on similar principle. In essence, what allows the focus signal generated in this manner is that the individual edges contributes a quantity (hereinafter "edge-sharpness measure") that is independent of scaling the image data by, for example, 20%, or essentially independent, such as changes by not more 5% for 20% scaling down of the image data, thus helping to make the focus signal independent of or far less dependent on illumination of the scene of the image or reflectivity of objects in the scene compared with the conventional contrast detection method.

In the present focus signal generator 120, any edge-sharpness measure that has the above characteristic of being independent of or essentially independent of 20% scaling down of the image data in addition is a good alternative to the width measured from a gradient or interpolated gradient to another gradient or interpolated gradient of a same gradient value.

The alternative edge-sharpness measure preferably has a unit that does not include a unit of energy. The unit of the edge-sharpness measure is determined on basis two points: (a) each sample of the image data on which the first-order edge-detection operator operates on has a unit of energy, (b) distance between samples has a unit of length. On basis of points (a) and (b), a gradient value has a unit of a unit of energy divided by a unit of length. Likewise, contrast across the edge or across any undivided portion of the edge has a unit of energy. Therefore the contrast is not a good edge-sharpness measure, as the unit reveals that it is affected by illumination of the scene and reflectivity of the object. Neither is peak gradient of the edge, because the unit of the peak gradient has a unit of energy in it, indicating also that it is responsive to a change in illumination of the scene. On the other hand, peak gradient of the edge divided by a contrast of the edge is a good edge-sharpness measure, as it has a unit of the reciprocal of a unit of length. As another example, the count of gradients whose gradient values exceeds a certain predetermine fraction of the peak gradient is a good edge-sharpness measure, as the count is simply a measure of distance quantized to the size of the spacing between contiguous gradients, hence having a unit of length.

It is here noted that, in the generation of the edge-sharpness measure, a gradient may be generated from a first-order edge detection operator used to detect the edge, or may be generated from a different first-derivative operator (i.e. gradient operator). For example, while the Sobel operator (or even a second-order edge detection operator, such as a Laplacian operator) may be used to detect the edge, the Roberts operator whose kernels are simply [−1, +1] and its transpose, which is simply subtracting one sample of the image data from the next sample in the orientation of the gradient operator, with the resulting gradient located midway between the two samples. Edges may be detected with a higher-order edge detection operator than first-order independently of one or more derivative operators used in generating the edge-sharpness measure or any of the shape measures described in the next section.

Viewing it another way, the edge-sharpness measure should have a unit of a power of a unit of length, for example a square of a unit of length, a reciprocal of a unit of length, the unit of length itself, or a square-root of a unit of length.

Any such alternative edge-sharpness measure can replace the edge width in the focus signal generator 120.

To correct for a slant of the edge, the correction factor as described above with reference to FIGS. 6A-6D and FIG. 7 (hereinafter "width correction factor") should be converted to adopt the same power. For example, if the edge-sharpness measure is peak gradient divided by a contrast, which gives it a unit of the reciprocal of a unit of length, then the appropriate correction factor for the edge-sharpness measure is the reciprocal of the correction factor described with reference to FIGS. 6A-6D and FIG. 7 above. As another example, if the edge-sharpness measure has a unit of a square of a unit of length, then the slant correction factor for the edge-sharpness measure should be a square of the width correction factor.

Several examples of alternative edge-sharpness measures are described below with reference to the drawings in FIG. 27, FIG. 28, FIG. 25, and FIG. 26.

Figure 27:
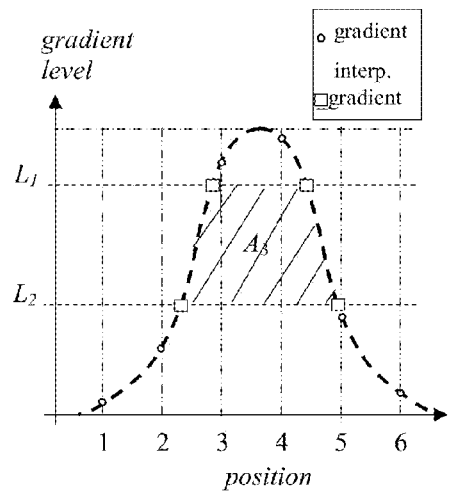
FIG. 27 illustrates a sequence of gradients across an edge plotted against distance in multiples of a spacing between successive gradients, and an area of a region under the plotted sequence of gradients.

FIG. 27 illustrates a sequence of gradients across an edge plotted against distance in multiples of a spacing between successive gradients, and an area $A_3$ of a shaded region under the plotted sequence of gradients. In this example, the region is defined between two gradient levels $L_1$ and $L_2$, which may be defined with respect to an interpolated peak gradient value (alternatively, the peak gradient value) of the sequence of gradients as, for example, predetermined portion of the interpolated peak gradient value. The shaded region has four corners of interpolated gradients. The area divided by the interpolated peak gradient value (alternatively, the peak gradient value) is a good edge-sharpness measure, as it has a unit of length. It is noted that alternative definitions of the region are possible. For example, the region may be bounded from above not by the gradient level $L_1$ but by the sequence of gradients.

Figure 28:
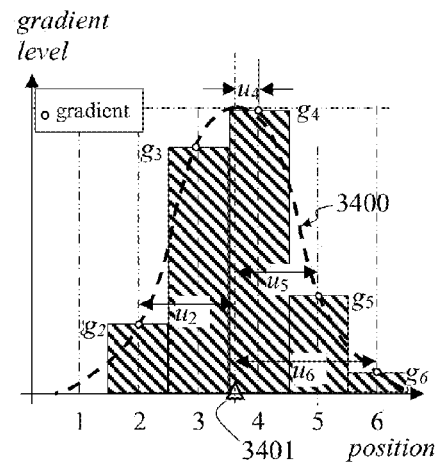
FIG. 28 illustrates a sequence of gradients of an image signal across an edge plotted against distance in multiples of a spacing between successive gradients, a center of gravity (i.e. center of moment), and distances of the gradients from the center of gravity.

FIG. 28 illustrates a sequence of gradients of samples of the image data across an edge plotted against distance in multiples of a spacing between successive gradients, a center of gravity 3401 (i.e. center of moment), and distances $u_2$, $u_3$, $u_4$, $u_5$ and $u_6$ of the gradients (having gradient values $g_2$, $g_3$, $g_4$, $g_5$ and $g_6$) from the center of gravity. A good edge-sharpness measure is a k-th central moment of the gradients about the center of gravity, namely a weighted average of the distances of the gradients from the center of gravity with the weights being magnitudes of the respective gradients, k being an even integer. For example, k can be 2, which makes the edge-sharpness measure a variance as if the sequence of gradients were a probability distribution. In this example, the edge-sharpness measure has a unit of a square of a unit of length. More generally, the edge-sharpness measure may be a function of distances of a plurality of gradients of a sequence of gradients from a position predefined relative to the plurality of gradients, the sequence being arrayed across the edge. Other than the center of gravity, the predefined position may be an interpolated peak position for the sequence of gradients. A proper subset of the gradients of edge may be chosen according to a predefined criterion to participate in this calculation. For example, the gradients may be required to have gradient values that are at least a predetermined fraction of the peak gradient or gradient value of an interpolated peak of the sequence of gradients.

Figure 25:
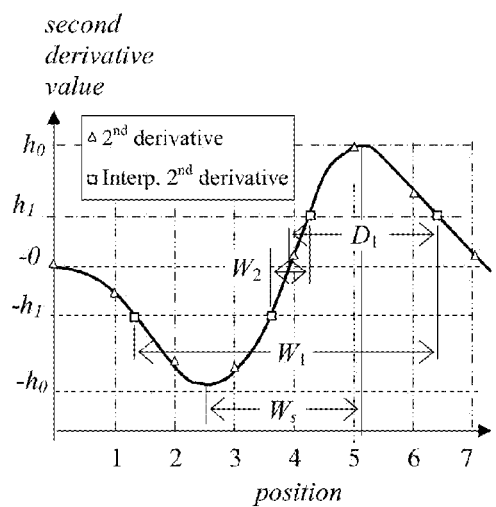
FIG. 25 illustrates a sequence of second derivatives of an image signal across an edge plotted against distance in multiples of a spacing between successive second derivatives, showing (a) a width $W_s$ between a pair of positive and negative peaks, (b) a width $W_1$ between a pair of outermost interpolated second derivatives that have a given magnitude $h_1$, (c) a width $W_2$ between an inner pair of interpolated second derivatives that have the given magnitude $h_1$, and (d) a distance $D_1$ from a zero-crossing (between the pair of positive and negative peaks) to an outermost interpolated second derivative that has the given magnitude $h_1$.

FIG. 25 illustrates a sequence of second derivatives of a sequence of samples of image data across an edge plotted against distance in multiples of a spacing between successive second derivatives, showing (a) a width $W_s$, between a pair of positive and negative peaks, (b) a width $W_1$ between a pair of outermost interpolated second derivatives that have a given magnitude $h_1$, (c) a width $W_2$ between an inner pair of interpolated second derivatives that have the given magnitude $h_1$, and (d) a distance $D_1$ from a zero-crossing (between the pair of positive and negative peaks) to an outermost interpolated second derivative that has the given magnitude $h_1$. Any one of the three widths $W_s$, $W_1$ and $W_2$ may used as the edge-sharpness measure. In general, determining the edge-sharpness measure may include computing the second derivatives and measuring a distance that is predefined with respect to the second derivatives.

In the example of FIG. 25, furthermore, the edge-sharpness measure may be a weighted sum of distances from the zero crossing (between the pair of positive and negative peaks, and may be interpolated) of the second derivatives with the weights being magnitudes of the respective second derivatives. More generally, the edge-sharpness measure may be an even-order central moment of the second derivatives from a predefined position (e.g. the zero crossing or, alternatively, a center of gravity, which may be a center of gravity). Even more generally, the edge-sharpness measure may be a function of distances of a plurality of second derivatives across the edge from a predefined position. Other than the zero-crossing position, a center of gravity is a good candidate for the predefined position, with the weights being magnitudes of the second derivatives or magnitudes of the gradients or magnitudes of the image samples. Another candidate for the predefined position is the midpoint between a pair of same-value gradient(s) and/or interpolated gradient(s) on two sides of the peak gradient. Another candidate for the predefined position is a midpoint between an inner pair of same-magnitude (interpolated) second derivatives (see endpoints of width measurement $W_2$ in FIG. 25), or between an outer pair of same-magnitude (interpolated) second derivatives (see endpoints of width measure $W_1$ in FIG. 25), or between a pair of positive peak and negative peak of the second derivatives (see endpoints of width measurement $W_s$ in FIG. 25), or between the beginning and the end (predefined according to a predetermined procedure) of the transition of image signal values across the edge.

Figure 26:
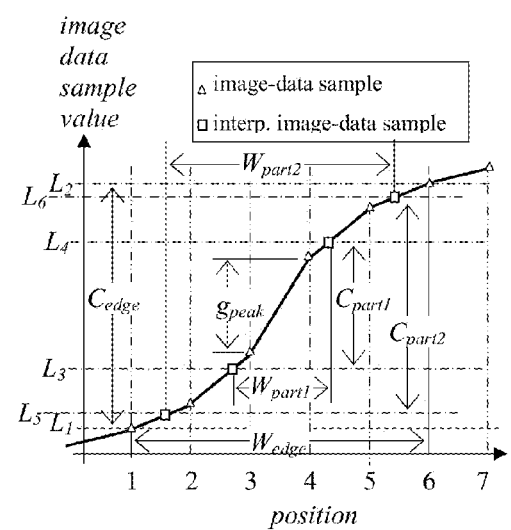
FIG. 26 illustrates a sequence of image data samples of the image signal plotted against distance in multiples of a spacing between successive samples, showing (a) a width $W_{edge}$ and a contrast $C_{edge}$ between two samples at two ends of the edge, (b) a peak gradient value $g_{peak}$ between a pair of samples that has a steepest change of sample value, (c) an undivided portion of the edge that has contrast $C_1$ and width $W_{part1}$, and (d) an undivided portion of the edge that has contrast $C_2$ and width $W_{part2}$.
Figure 29:
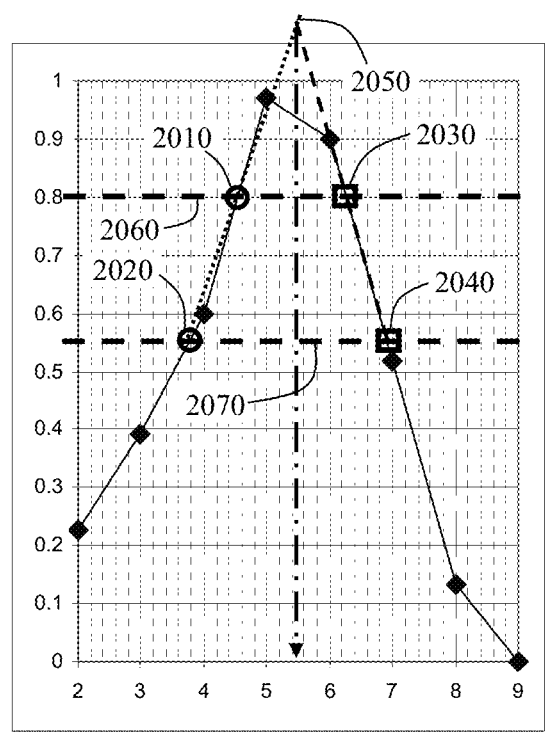
FIG. 29 illustrates finding an interpolated peak's position by interpolation.

FIG. 26 illustrates a sequence of samples of image data from pixels of an edge plotted against distance in multiples of a spacing between contiguous pixels, showing (a) a width $W_{edge}$ and a contrast $C_{edge}$ between two samples at two ends of the edge, (b) a peak gradient value $g_{peak}$ (generated by the Roberts operator) between a pair of samples that has a steepest change of sample value, (c) a narrowest undivided portion of the edge that has contrast $C_1$ and width $W_{part1}$, and (d) a narrowest undivided portion of the edge that has contrast $C_2$ and width $W_{part2}$. As mentioned before, the peak gradient value a $g_{peak}$ divided by the contrast $C_{edge}$ is a good edge-sharpness measure. The width $W_{edge}$ is another good edge-sharpness measure. The widths $W_{part1}$ and $W_{part2}$ are also good alternatives. The contrasts $C_1$ and/or $C_2$ may be defined to be a predetermined portion of the edge contrast $C_{edge}$. Alternatively, any one of the contrasts may be defined to be a predetermined multiple of a peak gradient (such as the peak gradient $g_{peak}$) of the edge. The "narrowest undivided portion" may be delimited by interpolated samples of image data, such as shown in squares in FIG. 26, or by rounding down or up to a nearest pixel count.

In general, the edge-sharpness measure may be determined by measuring a distance between a pair of positions defined with respect to (interpolated) samples of an image signal. The pair of positions may be any pair of the aforementioned endpoints determined from contrast of the image sample sequence, from gradients, or from second derivatives. Alternatively, one of the positions may be a midpoint (such as anyone described above) between another pair of endpoints instead.

Gradient Asymmetry

Figure 23A:
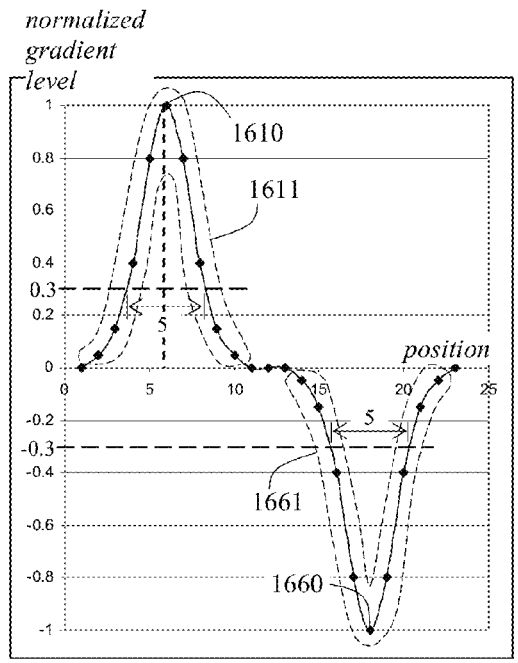
FIG. 23A illustrates a gradient of an image signal across two adjacent edges of opposite polarities (i.e. signs) where the edges do not interact.
Figure 23B:
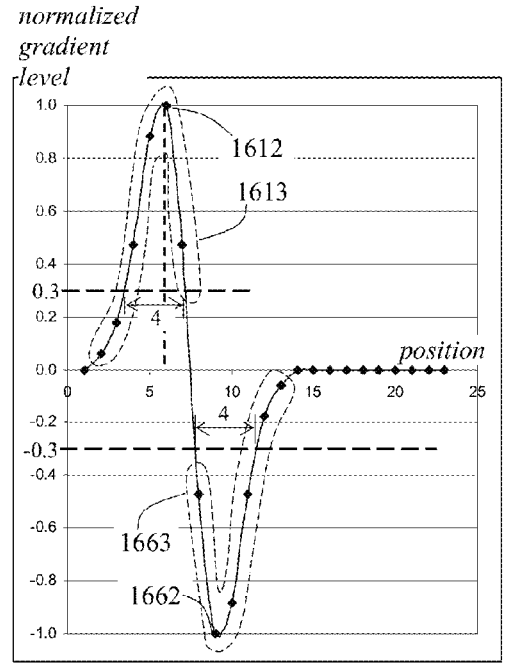
FIG. 23B illustrates a gradient of an image signal across two adjacent edges of opposite polarities (i.e. signs) where the edges interact.

FIG. 23A and FIG. 23B illustrate a method where the focus signal generator detects a lack of symmetry about a peak in a gradient signal (also referred to below as gradient profile) to de-emphasize or eliminate altogether an associated edge from influencing an autofocus control system (such as via a focus signal generated as a function, such as a weighted average, of an associated edge width or an edge count, but not limited thereto). The peak may be a peak gradient among a series of consecutive gradients. Alternatively, the peak may be an interpolated peak gradient that is interpolated from two or more gradients among the series of consecutive gradients. FIG. 23A illustrates a gradient profile of an image signal across two adjacent edges of opposite polarities (i.e. signs) where the edges are apart and do not interact. FIG. 23B, on the other hand, illustrates a gradient profile of an image signal across two adjacent edges of opposite polarities where the edges are close enough to mutually interact. It is clear from comparing FIGS. 23A and 23B that where adjacent edges of opposite signs (i.e. one of the edges has positive gradients, while the other one has negative gradients) become close, their respective gradient profile loses symmetry.

In FIG. 23A, from left to right, the gradient profile rises to a positive peak gradient 3210 on the left at position 6 and dips to a negative peak gradient 3260 on the right at position 18. The gradient values are normalized to give peak gradient magnitudes of 1.0. Adjacent to each peak gradient 3210, 3260, respectively, the gradient profile has a left-to-right symmetry about the peak. Using a threshold of 0.3 times the respective peak gradient magnitude, the positive gradient profile 3211 and the negative gradient profile 3261 each corresponds to an edge width of 5 for the respective edge.

In FIG. 23B, on the other hand, a positive peak gradient 3212 on the left at position 6 and a negative peak 3262 on the right at position 9 are closer together than in FIG. 23A. In FIG. 23B, as in FIG. 23A, the gradient values are normalized to give peak gradient magnitudes of 1.0. The edges that correspond to the positive gradient profile 3213 and negative gradient profile 3263, respectively, in FIG. 23B apparently interact to partially cancel each other, causing a reduction in magnitudes of gradients that lie between the closely adjacent positive 3212 and negative 3262 peaks at positions 6 and 9, respectively.

As a result, the gradient profiles 3213, 3263 lack left-right reflection symmetry over the respective edges. The lack of symmetry is particularly salient in the interpolated gradient profile (shown in solid curve) in the figures. The lack of symmetry can be found within a certain distance from the peak gradient (in particular, the distance between 0.2 to 0.7 times the edge width of the edge) or a certain range of gradient levels between its peak gradient level and a non-zero fraction thereof (in particular, within 10% to 90% of the peak gradient level; more particularly, within 20% to 80%). For example, asymmetry may be found by comparing an the left side and the right side of the interpolated gradient profile within a distance of half the edge width, or alternatively within a range of gradient levels between 20% and 80% of its peak gradient level.

As another result, the edge width around each peak 3212, 3262 is reduced to 4, measured using the same threshold of 0.3 times the peak gradient magnitude. The edge widths of both edges thus measured no longer represent a degree of focusing. The focus signal generator may detect the asymmetry and either cause a de-emphasis of a contribution of an associated edge width towards a focus signal and/or an edge count or an elimination altogether. More generally, the focus control system for attaining sharper images by examining sharpness of edges in the images may de-emphasize or eliminate altogether an influence of an edge across which the gradient profile lacks symmetry.

Isolated edges in an image that arise from sharp boundaries in the scene have gradient profiles that each reveals a left-right reflection symmetry across the respective isolated edge. In FIG. 23A, there is a left-right reflection symmetry along the vertical symmetry axis (vertical dashed line), which happens to be under the peak gradient 3210 at position 6 such that under a reflection along the vertical axis of symmetry the gradient at position 4 is mapped to the gradient at position 7 and vice versa, the gradient at position 3 is mapped to the gradient at position 8 and vice versa, and so on. This happens because the boundary that corresponds to the edge that corresponds to gradient profile 3211 happens to be sampled at its middle. In many cases, the boundary is not sampled at its middle, and as a result the vertical axis of symmetry does not coincide with a pixel position but is found between two pixels. Nevertheless, the left-right reflection symmetry can be identified with help of interpolation, as discussed below.

FIG. 24J illustrates another typical gradient profile of an isolated edge. Peak gradient 3212' at position 6 and four other gradients to its right at positions 2 to 5 and another four other gradients to its left at positions 7 to 10 together constitute a gradient profile for the isolated edge. An interpolated peak 3270' is shown at position 5.85 approximately, and a vertical axis of symmetry 3271' is shown in dash-dot line under the interpolated peak 3270'. Although each gradient in the gradient profile does not map to another gradient in the same gradient profile under a reflection along the axis of symmetry 3271', it does map to an interpolated gradient. For example, the gradient at position 3 maps to an interpolated gradient marked with "X" (at approximately position 8.6), which is clearly a good interpolation between the gradients of positions 8 and 9, and vice versa. Likewise, the gradient at position 7 maps to an interpolated gradient marked with "+" (at approximately position 4.6), which is clearly a good interpolation between the gradients at positions 4 and 5, and vice versa. Furthermore, one can see that an interpolated gradient maps to another interpolated gradient and vice versa, such as the pair of interpolated gradients marked with a triangle and an inverted triangle, respectively, at gradient level 0.5 (and positions 4 and 7.6, respectively). The left-right reflection symmetry is especially salient when the gradient profile is interpolated to a interpolated gradient profile (solid curve in FIG. 24J). One should notice also that midpoints (such as midpoints 3281' and 3280') between both sides of the gradient profile at any two gradient levels coincide at the same midpoint position 3287, which is also the position of the interpolated peak, as well as the position of the axis of symmetry.

It is commonly understood that for a left-right reflection symmetry to exist, each geometry reflected along a vertical axis of symmetry is mapped to a corresponding geometry, i.e. coincides with the latter. Such geometries include point (i.e. gradient or interpolated gradient), line, curve, bounded region, corner, etc. Corresponding to such geometries are geometric parameters such as distance, length, area, inclination (i.e. first derivative), curving (i.e. second derivative and higher derivatives), etc. For example, a segment along the interpolated gradient profile (or straight line segments connecting adjacent gradients) will map to another segment at the same gradient level(s), thus having same length. Another property of left-right reflection symmetry is that points on the axis of symmetry are mapped to themselves, i.e. are not moved. Hence they have equal distance to the left and to the right. It is also known that between two geometries that mapped to each other under the symmetry, the vertical line of symmetry lies exactly midway between them. With these properties and others commonly known regarding reflection symmetry, various methods can be devised to test whether a gradient profile has a left-right reflection symmetry.

Due to the nature of interpolation being an approximation, a predetermined tolerance region on parameter(s) for testing coincidence of geometries is used to verify symmetry. For example, if X and Y are two parameters being measured, and a perfect symmetry would result in X=Y exactly, a tolerance region may be specified such that $-A<X-Y<B$, where A and B are positive numbers, such that values of X−Y greater than −A and less than B do not result in a determination of asymmetry, whereas values of X−Y either more positive than B or more negative than −A will result in determination of excessive lack of symmetry. The range of values of X−Y less negative than −A and less positive than B is referred to hereinafter as tolerance region, and the limits of the tolerance region are the asymmetry thresholds. In this example, accordingly, −A and B are both asymmetry thresholds that delimit the tolerance region for the asymmetry that X and Y measures. When the value of X−Y lies outside the tolerance region, it is hereinafter referred to as exceeding the (relevant) asymmetry threshold. For example, if (X−Y) is more positive than B, (X−Y) is said to exceed the asymmetry threshold B. If (X−Y) is more negative than −A, (X−Y) is said to exceed the asymmetry threshold −A. "Exceed" in this context conveys the meaning that the parameter (X−Y) has exited the tolerance region by crossing the pertinent boundary of the tolerance region.

Alternatively, a function of Z, where $Z=(1-X/Y)$, can be used to define a relative extent to which to reduce a contribution of the edge towards the focus signal as compared with other edges that contribute. This function of Z may, for instance, be a sigmoid function of the absolute value of Z, such that the function takes a value of one where Z is zero (i.e. X=Y, such as under perfect symmetry) and rise slowly as |Z| approaches towards a cutoff value, then rises rapidly as |Z| gets nearer and finally exceeds the cutoff value and converges to zero.

Below various methods are described to detect lack of left-right reflection symmetry in a gradient profile across an edge, but this is not an exhaustive listing. This aspect of the invention, i.e. eliminating or attenuation a contribution of an edge towards a focus signal or towards a focus control, is not limited to the specific methods discussed below for detecting lack of reflection symmetry of the gradient profile across the edge but include their equivalents, approximations, obvious or known variations, as well as include any computational method that makes use of one or more of the properties of reflection symmetry discussed above.

One method to detect the lack of symmetry is to find a difference between a count of pixels on a side of the peak gradient and that on the other side, gradient magnitudes associated with the pixels being above a certain fraction of a peak gradient magnitude. A count asymmetry threshold may be set at, for example 0.5, so that when any one side counts more pixels than the other side in excess of the count asymmetry threshold, lack of symmetry is detected. This is illustrated by way of an example using FIG. 23A and FIG. 23B and a fraction of 0.3 and a count asymmetry threshold of 0.5. In FIG. 23A, for the positive peak on the left and at position 6, and above gradient level of +0.3, two pixels lie to the left at positions 4 and 5, respectively, and two pixels lie to the right at positions 7 and 8, respectively. The pixel count is equal between the left and right sides, thus no asymmetry is detected. In FIG. 23A, on the other hand, for the positive peak on the left at position 6, and above gradient level of +0.3, two pixels lie to the left at positions 4 and 5, respectively, but only one pixel lies to the right at position 7. There is one more pixel on the left than on the right in the positive gradient profile 3213 on the left in FIG. 52B, exceeding the count asymmetry threshold of 0.5, thus a lack of symmetry is detected.

A modification is to interpolate from the gradients to find a fractional pixel position 3272 ("interpolated peak position") where an interpolated gradient profile attains a maximal magnitude ("interpolated peak gradient"). This interpolated peak position may be used to calculate the distances to the left and to the right as described below. The interpolated peak gradient may also be used to calculate the gradient level at which those distances are measured or above/below which pixels are counted. For example, in FIG. 24A, a vertical dash-dot line is drawn under an interpolated peak 3270, a horizontal dotted line 3275 is drawn across the interpolated gradient profile (in solid curve) at gradient level 0.95 (upper gradient threshold), a horizontal dashed line 3273 is drawn across the interpolated gradient profile at gradient level 0.25 (lower gradient threshold), two pixels are counted at positions 4 and 5, respectively, on the left of the peak gradient 3212 (at position 6), and only one pixel is counted on the right at position 7. Whether the peak gradient 3212 (at position 6 in this example) or the interpolated peak 3270 (at approximately position 5.8) is referred to has no bearing on the determination of asymmetry since in the former the peak gradient 3212 is not counted in the count for either the left or right side whereas in the latter an upper threshold 3275 (0.95 in this example, and in general should be between 0.85 and 0.97) excludes the peak gradient 3212 from being counted in the right-side count.

Figure 24A:
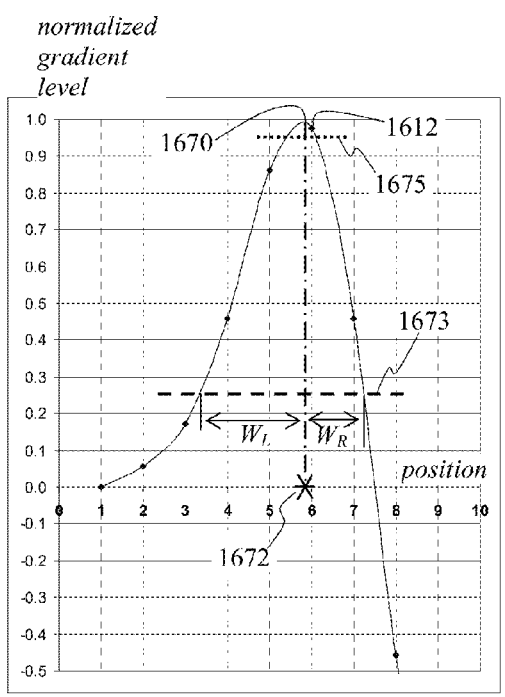
FIG. 24A shows the positive gradients from FIG. 23B and illustrates that the distance between a pair of interpolated gradients at a particular gradient level is divided into two unequal distances by the interpolated peak.

A modification to the above method is to determine the distances to the left and the right, respectively, from the peak gradient to where the gradient profile is interpolated to cross a certain gradient level that is a fraction (preferably between 10% and 90%, more preferably between 20% and 80%) (the "crossings") of the gradient value of the peak gradient 3212 (alternatively, the interpolated peak 3270), and find a lack of symmetry if the larger distance exceeds the smaller distance by a certain width asymmetry threshold or more. In other words, one distance subtracts the other distance being more negative than −(width asymmetry threshold) or more positive than the width asymmetry threshold will cause a determination of lack of symmetry. The tolerance region thus occupies an interval of number symmetrical about zero. The width asymmetry threshold may be determined in one of several ways. It may be given as a fixed number for an image, or a number that depends on the edge width of the edge associated with the peak, such as 10% of the edge width if the edge width is 3 or less, and 7% of the edge width if the edge width is wider than 3 but less than 5. Other reasonable dependencies based on how the image signal (from which the gradients in the gradient profile are generated) and/or how the gradients in the gradient profile are generated are acceptable for determining the width asymmetry threshold, in particular to allow for inaccuracies in interpolating the peak and/or in interpolating the crossings. FIG. 24A also illustrates this asymmetry detection method. The distances may be measured from the peak gradient 3212 (at position 6), or alternatively from the interpolated peak 3270 (at approximately position 5.8). In this example, the distances $W_L$ and $W_R$ are measured from the interpolated peak 3270, giving approximately 2.5 and 1.3, respectively, and giving a difference of 1.2. The edge width is measured at normalized gradient level of +0.3, giving approximately 3.7. The width asymmetry threshold may be given as a fraction of the edge width, for instance 15%, giving 0.56. Since the difference (1.2) exceeds the width asymmetry threshold (0.56), a lack of symmetry is found. It should be noted that whether the peak gradient 3212 (at position 6 in this example) or the interpolated peak 3270 (at approximately position 5.8) is referred to has negligible bearing on focus signal or on the focus control system since the difference between their positions is generally less than 0.5 and usually less than 0.3, resulting in a difference in $|W_L - W_R|$ being less than 0.6. In the vast majority of situations when gradient profiles over edges become asymmetrical, the mismatch between $W_L$ and $W_R$ far exceed 0.6. Whether one or the other is chosen to measure $W_L$ and $W_R$ from therefore only affects the finding of lack of symmetry for a negligible minority of edges.

Figure 24B:
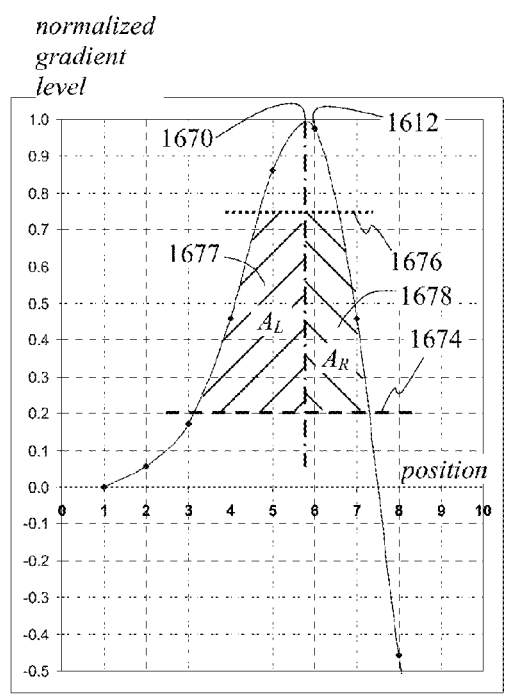
FIG. 24B shows the positive gradients from FIG. 23B and illustrates that the area between two gradient levels and bordered on the left and right by the two sides of the gradient profile is divided into two regions of unequal areas by a vertical line directly under the interpolated peak.

An alternative method is to evaluate two areas, one to the left and the other to the right of the peak gradient 3212 (alternatively the interpolated peak 3270), and compare them according to a prescribed criterion against an area asymmetry threshold. Each of the two areas may be bounded on one side by a vertical line below the peak gradient (or the interpolated peak), on the other side by the interpolated gradient (in solid curve) (or, alternatively, straight lines connecting consecutive gradients), and from the top and bottom by an upper gradient level and a lower gradient level each at a different predetermined fraction of the peak gradient level (or, alternatively, interpolated peak gradient level, i.e. gradient level of the interpolated peak) (alternatively, no upper gradient level limits the area but just the gradients or interpolated gradient profile). By way of example, in FIG. 24B, where the gradient profile is normalized such that the interpolated peak has gradient level 1.0, an upper gradient level 3276 is drawn at 0.75 and a lower gradient level 3274 at 0.2. A region 3277 (with area $A_L$) (left of the positive interpolated peak 3270) is bounded from above by the upper gradient level 3276, from below by the lower gradient level 3274, from the right by the vertical dash-dot line under the interpolated peak, and from the left by the interpolated gradient profile (solid curve). A region 3278 (having area $A_R$) (right of the same peak 3270) is similarly bounded from above and below, and is bounded from the right by the interpolated gradient profile and from the left by the vertical dash-dot line. A lack of symmetry is detected when the areas $A_L$ and $A_R$ differ beyond a predetermined limit according to a prescribed criterion. For example, the asymmetry may be detected when the larger area exceeds the smaller area by an area asymmetry threshold or more. The area asymmetry threshold may be expressed in one of various different ways. It may be expressed in terms of a percentage (of the lesser area), which may be a fixed number for the image or, alternatively, a function of the edge width of the associated edge. Alternatively, it may be expressed in terms of an area difference for the normalized gradient profile. Other reasonable dependencies based on how the image signal (from which the gradients in the gradient profile are generated) and/or how the gradients in the gradient profile are generated are acceptable for determining the area asymmetry threshold.

In another method, shown in FIG. 24I, a common distance $W_o$ is measured from the interpolated peak 3270 (or, alternatively, peak gradient 3212) to the left and right sides of the gradient profile. In other words, interpolated gradients are calculated (or gradient is found) such that their distances from the vertical dash-dot line under the interpolated peak 3270 (or peak gradient 3212) are both $W_o$. For a perfectly symmetrical gradient profile, both interpolated gradients would be at a common gradient level. For an asymmetrical gradient profile, however, the interpolated gradients lie on different gradient levels $G_l$ 3252, $G_h$ 3253. A lack of symmetry is detected when the gradient levels $G_l$ and $G_h$ differ beyond a predetermined limit according to a prescribed criterion. For example, the asymmetry may be detected when the excess $G_{hl}$ of the larger gradient level $G_h$ 3253 over the smaller gradient level $G_l$ 3252 exceeds the smaller gradient level $G_l$ by an gradient asymmetry threshold or more. The gradient asymmetry threshold may be expressed in one of various different ways. It may be expressed in terms of a percentage (e.g. of the lesser gradient $G_l$), which may be a fixed number for the image or, alternatively, a function of the edge width of the associated edge. Alternatively, it may be expressed in terms of a gradient level difference for the normalized gradient profile. Other reasonable dependencies based on how the image signal (from which the gradients in the gradient profile are generated) and/or how the gradients in the gradient profile are generated are acceptable for determining the gradient asymmetry threshold. The common $W_o$ may be selected to be a predetermine fraction of the edge width, such as a fraction between 0.1 and 0.5, preferably between 0.2 and 0.4. Alternatively, $W_o$ may be selected as the lesser of the two distances from the interpolated peak 3270 (or, alternatively, the peak gradient 3212) to a pair of interpolated gradients or gradients at a given gradient level that is a predetermined fraction of the peak gradient level. In this case, $G_h$ alone can be the parameter to indicate a degree of asymmetry. A gradient asymmetry threshold then may be set such that when $G_h$ exceeds the threshold the lack of asymmetry is detected. Other variations on how to define $W_o$ and how to define the criterion are possible as one skilled in the art may contemplate.

A modification of the immediate above method is to compare between first or second derivatives at those two interpolated gradients at gradient levels $W_l$ and $W_h$, respectively. For a perfectly symmetrical gradient profile, both interpolated gradients would be have first derivatives that are opposite in their signs but otherwise same, and second derivatives that are identical in sign and magnitude. For an asymmetrical gradient profile, however, the interpolated gradients usually differ in first and second derivatives. A lack of symmetry is detected when the magnitude of the first derivative differs between the two interpolated gradients (or possibly gradients) beyond a predetermined limit according to a prescribed criterion. For example, the asymmetry may be detected when the larger first derivative exceeds the smaller first derivative in magnitude by an asymmetry threshold or more. As another example, the asymmetry may be detected when subtracting one of the second derivatives from the other gives a difference that exceeds an asymmetry threshold. The asymmetry threshold may be expressed in one of various different ways. It may be expressed in terms of a percentage (e.g. of the smaller first/second derivative), which may be a fixed number for the image or, alternatively, a function of the edge width of the associated edge. Other reasonable dependencies based on how the image signal (from which the gradients in the gradient profile are generated) and/or how the gradients in the gradient profile are generated are acceptable for determining the gradient asymmetry threshold.

In the above methods for detecting asymmetry using pixel count or distance (FIG. 24A) or area (FIG. 24B), instead of dividing up the counts or the distances or the areas based on either an interpolated peak or a peak gradient, a midpoint like described earlier can be used. For example, in dividing up the area between the upper gradient level 3276 and the lower gradient level 3274 into two regions of areas $A_L$ and $A_R$, respectively (see FIG. 24B) using the vertical dash-dot line directly under the interpolated peak 3270, a vertical line can be drawn from a midpoint between the pair of intersections between the upper gradient level (horizontal dotted line at normalized gradient level 0.75) and the interpolated gradient profile (in solid curve). Alternatively, it can be drawn from a midpoint between the pair of intersections between the lower gradient level (horizontal dashed line at normalized gradient level 0.2). Alternatively, it can be drawn from a midpoint between a pair of intersections between the interpolated gradient profile and any gradient level within a range of predetermined percentages of the peak gradient's gradient level, e.g. between 10% and 90%.

Another modification to the area method above is to evaluate lengths of the interpolated gradient curve (alternatively, straight line segments connecting consecutive gradients) between those upper and lower gradient levels 3274, 3276. By way of example, in FIG. 24C, the interpolated gradient curve has a segment on the left (having a length $L_L$) between normalized gradient levels of 0.25 and 0.75, longer than a segment on the right, whose length $L_R$ is clearly shorter, indicating a lack of symmetry. A lack of symmetry is detected when the lengths $L_L$ and $L_R$ differ beyond a predetermined limit according to a prescribed criterion. For example, the asymmetry may be detected when the longer length exceeds the shorter length by a length asymmetry threshold or more. Like the area asymmetry threshold above, the length asymmetry threshold may be expressed in one of various different ways. It may be expressed in terms of a percentage (such as of the lesser length), preferably from 10% to 30%, which may be a fixed number for the image or, alternatively, a function of the edge width of the associated edge. Alternatively, it may be expressed in terms of a length difference for the normalized gradient profile. Other reasonable dependencies based on how the image signal (from which the gradients are generated) and/or how the gradients are generated are acceptable for determining the length asymmetry threshold. It should be noted that, as above, whether the peak gradient 3212 or the interpolated peak 3270 is referenced in drawing up the lower or upper gradient levels is immaterial for the focus control system or, in particular, the focus signal. The choice results in very minor difference in the difference of lengths, with the result that in the vast majority of situations when two edges of opposite signs are too close as to affect their edge widths, the mismatch between $L_L$ and $L_R$ is far greater. Whether one or the other is chosen to measure $L_L$ and $L_R$ from therefore only affects the finding of lack of symmetry for a negligible minority of edges.

Figure 24C:
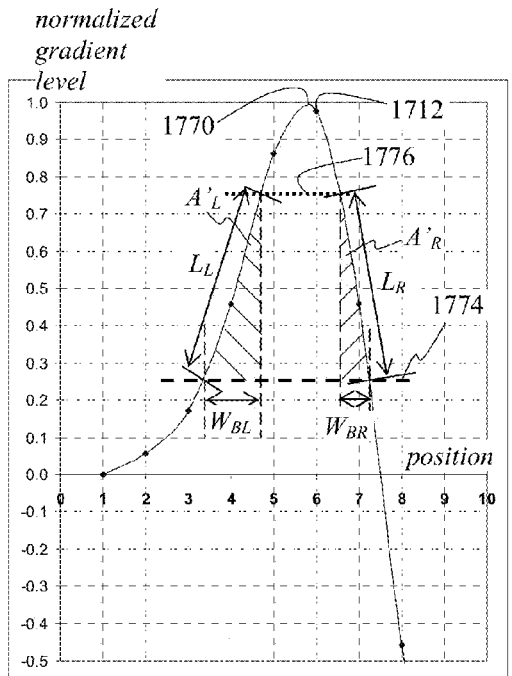
FIG. 24C shows the positive gradients from FIG. 23B and illustrates a length of a segment of the gradient profile between two gradient levels, an area of a region vertically under the segment and the lower gradient level, and a width of a base of the region.

The method described immediately above and illustrated using FIG. 24C may be modified. Instead of comparing lengths $L_L$ and $L_R$, the areas $A'_L$ and $A'_R$ of the shaded regions on the left and right sides, respectively, can be compared in a similar manner. An area asymmetry threshold may be defined similarly and used to compare with a magnitude of difference between $A'_L$ and $A'_R$.

The length method described immediately above and illustrated using FIG. 24C may be modified in yet another way. The distance on the left ($W_{BL}$) between where the interpolated gradient curve intersects the upper and lower gradients, respectively, with that on the right ($W_{BR}$) is compared. The a lack of symmetry is found if $W_{BL}$ and $W_{BR}$ differ too much according to a prescribed criterion. For example, a lack of symmetry is found when the larger of $W_{BL}$ and $W_{BR}$ exceeds the smaller one by more than a width asymmetry threshold. Again, the width asymmetry threshold may be prescribed in a manner like any one of the various asymmetry thresholds above.

FIG. 24H illustrates an alternative method that is equivalent to the width method described immediately above. This method calculates a first midpoint 3281 (upper midpoint) between the two interpolated gradients 3284, 3285 at the upper gradient level 3276 and a second midpoint 3280 (lower midpoint) between the two interpolated gradients 3282, 3284 at the lower gradient level 3274, and calculates a distance $X_{ab}$ between the first 3281 and second 3280 midpoints. A perfectly symmetrical gradient profile has negligible distance between the first 3281 and second 3280 midpoints ("inter-midpoint distance"), i.e. the midpoints coincide, like in FIG. 24J. A lack of symmetry is detected when the inter-midpoint distance exceeds a certain inter-midpoint-distance asymmetry threshold. The inter-midpoint distance is twice of $|W_{BL} - W_{BR}|$. In a variation on this method, only one gradient level 3274 is used and only the corresponding midpoint 3280 is calculated, and a distance $X_{bPk}$ is measured from the peak gradient 3212 (or, alternatively, the interpolated peak 3270) to the lone midpoint 3280, as is also shown in FIG. 24H.

Figure 24D:
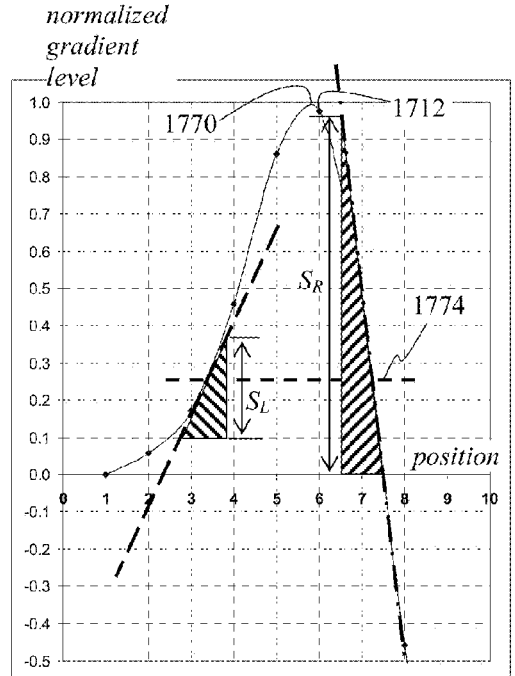
FIG. 24D shows the positive gradients from FIG. 23B and illustrates a method for estimating the first derivative.
Figure 24E:
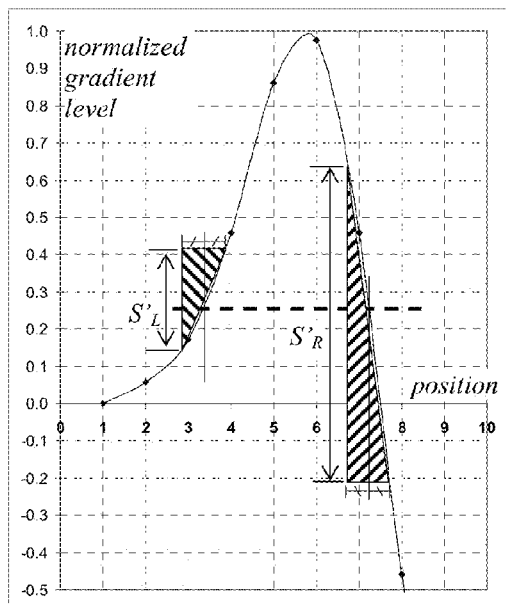
FIG. 24E shows the positive gradients from FIG. 23B and illustrates an alternative method for estimating the first derivative.

Yet another method is to find first derivatives of slopes of the gradient profile on two sides of the peak gradient 3212 (alternatively, the interpolated peak 3270) and compare the first derivatives under a prescribed criterion to determine whether there is a lack of symmetry. For example, if the magnitude of the first derivative of the steeper slope exceeds that of the less steep slope by a first-derivative asymmetry threshold or more, a lack of symmetry is found. On the other hand, perfectly symmetrical gradient profile will have identical first derivatives on both sides that only differ in sign but are identical in magnitude. The first derivatives may be calculated approximately by an interpolation. The first derivatives may be calculated approximately at a gradient level that is a certain fraction (preferably between 10% and 90%, more preferably between 20% and 80%) of the peak gradient value, for example 0.5. In FIG. 23B, where the gradient level is at 0.5 times the gradient level of the peak gradient 3212, there is a pair of consecutive rising and falling slopes, one on each side of the positive peak gradient 3212. The right-side slope is conspicuously steeper than the left-side slope. FIG. 24D shows how the first derivatives are evaluated on the normalized gradient profile at a gradient level of 0.25 and approximated with hypotenuses of right-angled triangles (shaded) that have base width of 1 touching the left and right sides of the interpolated gradient profile, respectively. The first derivatives are approximated by the heights of triangle $S_L$ and $S_R$, respectively. FIG. 24E illustrates another way to approximate the first derivatives using two triangles that have identical base width (1 in this illustration). The base of each triangle is centered at a position where the gradient profile is interpolated to be at the gradient level of 0.25. Each end of the corresponding hypotenuse is a half pixel away and take as gradient value a gradient value interpolated from the gradient profile. The first derivatives are approximated as the heights $S'_L$ and $S'_R$ divided by the base width, which is 1 in this illustration. As is commonly known, there are various methods to approximate a first derivative from a sequence of data points, and therefore this aspect of the invention is not limited to the particular examples given above but includes all equivalent methods and all approximations to provide the first derivative.

Figure 24F:
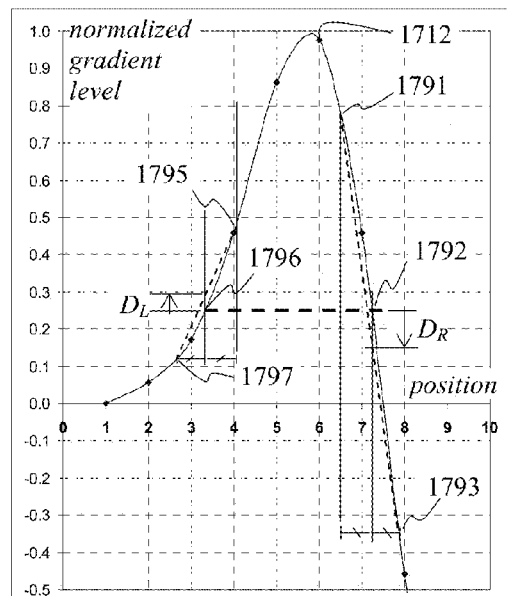
FIG. 24F shows the positive gradients from FIG. 23B and illustrates a method for estimating the second derivative.

Still another method is to find second derivatives of the gradient profile on two sides of the peak gradient 3212 (alternatively, the interpolated peak 3270) and compare the second derivatives under a prescribed criterion to determine whether there is an asymmetry. For example, if one exceeds the other by an second-derivative asymmetry threshold or more, then a lack of symmetry is found. On the other hand, perfectly symmetrical gradient profile will have identical second derivates on both sides that agree in sign and magnitude. The second derivatives may be calculated approximately by an interpolation. The second derivatives may be calculated at a gradient level that is a certain fraction (preferably between 10% and 90%, more preferably between 20% and 80%) of the peak gradient value, for example 0.25. FIG. 24F illustrates a method of how the second derivate may be approximated. First, a triplet of consecutive equally spaced gradients or interpolated gradients 3295, 3296, 3297 on the left and another triplet 3291, 3292, 3293 on the right are found, with the respective middle points 3296, 3292 being at the normalized gradient level of 0.25. For a given spacing within the triplets, the respective height ($D_L$ and $D_R$) of an arithmetic mean of the normalized gradient values of the respective outer pair of points (3295, 3297 on the left and 3291, 3293 on the right) above the normalized gradient level of 0.25 is found as an approximation to the respective second derivative. As FIG. 24F shows, $D_L$ is positive whereas $D_R$ is negative.

FIG. 24G illustrates another approximation for the second derivative, and at normalized gradient level of 0.18. On each side, one triangle is fitted to the gradient profile above and another triangle below the point of crossing between the interpolated gradient profile and the gradient level of 0.18 (i.e. a gradient or an interpolated gradient at this gradient level). Each triangle has its hypotenuse inclined at an inclination to fit the hypotenuse to the interpolated gradient profile. The heights $S_{UL}$ and $S_{LL}$ of the triangles on the left ($S_{UR}$ and $S_{LR}$ of the triangles on the right) are subtracted to find second derivative $D_L$ ($D_R$). The opposite signs of the second derivates are indicated with the arrows: pointing up for $D'_L$, pointing down for $D'_R$. This gradient profile clearly has significant mismatch of second derivatives on two sides, thus is asymmetrical.

As is commonly known, there are various methods to approximate a second derivative from a sequence of datapoints, and therefore this aspect of the invention is not limited to the particular examples given above but includes all equivalent methods and all possible approximations for the second derivative.

Although the above examples describe detecting the lack of reflection symmetry using different measurement parameters, two or more of the above methods can be used simultaneously to calculate their respective measurement parameters and these measurement parameters are combined to form a comparison parameter to compare with an asymmetry threshold or more generally a predetermined tolerance region such that when a value of the comparison parameter is outside the tolerance region the lack of reflection symmetry is detected. For example, the distances between midpoints $X_{ab}$ (FIG. 24H) and the difference between first derivatives $S_R-S_L$ (FIG. 24D) may be combined in a weighted average Z and then compared with an asymmetry threshold a that defines a tolerance region as an interval $-\alpha<Z<\alpha$.

Detecting that the edge has asymmetry in a sequence of gradients across itself need not necessarily involve computation directly on the sequence of gradients.

The asymmetry can be detected in the image sample values across the edge. Referring to FIG. 26, for the two narrowest undivided portions of the edge that have contrasts C1 and C2 respectively, their centers will match if there is perfect symmetry in the gradients. A misalignment between the centers indicates asymmetry. The misalignment can be measured and divided by a width of the edge to provide a quantity that indicates asymmetry in the gradient profile across the edge.

Alternatively, a distance from the center of one of the undivided portions corresponding to contrast C1 to where the sequence of gradient has the steepest rise or fall, with peak gradient a $g_{peak}$ (according to Roberts detector) and divided by a width of the edge to indicate a degree of asymmetry.

Further alternately, asymmetry can be measured from second derivatives of the image samples. Referring to FIG. 25, the differences in the distances of the negative and positive peaks from the interpolated zero-crossing between them, divided by the distance between these peaks, indicates a degree of asymmetry.

The above detection and solution for asymmetric edges may be performed in the Edge Detection & Width Measurement Unit 206.

It is noted that, in this disclosure, a quantity from an edge, such as a gradient level, is said to be normalized when it is divided by, by default unless otherwise specified, either a peak gradient value of the edge or gradient value of an interpolated peak. For example, in FIG. 23B, peak gradient 3212 has a normalized value of exactly 1, whereas in FIG. 24C the interpolated peak 3270 is different from the peak gradient 3212, and the gradients shown in FIG. 24C are normalized with respect to the interpolated peak 3270, not the peak gradient 3212.

Length Filter

Below describes a function of length filter 212. Broadly defined, length filter 212 creates a preference for edges that each connects to one or more edges of a similar orientation. A group of edges that are similarly oriented and mutually connected within the group ("concatenated edge") is less likely to be due to noise, compared with an isolated edge that does not touch any other edge of similar orientation. The more edges of a similar orientation thus concatenated together, the lesser the chance of them being due to noise. The probability of the group being due to noise falls off exponentially as the number of edges within the group increases, and far faster than linearly. This property can be harnessed to reject noise, especially under dim-lit or short-exposure situations where the signal-to-noise ratio is weak, e.g. less than 10, within the image or within the region of interest. The preference may be implemented in any reasonable method to express such preference. The several ways described below are merely examples.

A first method is to eliminate edges that belong to vertical/horizontal concatenated edges having lengths lesser than a concatenated length threshold. The concatenated length threshold may be larger when the region of interest is dimmer. For example, the concatenated length threshold may start as small as 2, but increases to 8 as a signal-to-noise ratio within the region of interest drops to 5. The concatenated length threshold may be provided by the processor 112, 112', 112", for example through a 'length command' signal, shown in FIG. 3, as part of signals 132. Alternately, the threshold may be calculated according to a formula on the focus signal generator.

A second method is to provide a length-weight in the length filter 212 for each edge and apply the length-weight to a calculation of focus signal in the focus signal calculator 210. An edge that is part of a longer concatenated edge receives a larger weight than one that is part of a shorter concatenated edge. For example, the length-weight may be a square of the length of the concatenated edge. Thus, a contribution of each edge towards the focus signal may be multiplied by a factor A/B before summing all contributions to form the focus signal, where B is a sum of the length-weights of all edges that enter the focus signal calculation, and A is a length-weight of the edge. Likewise, the edge-width histogram, which may be output as part of signals 134, may have edges that are members of longer concatenated edges contribute more to the bins corresponding to their respective edge width, thus preferred, instead of all edges contribute the same amount, e.g. +1. Thus, for example, each edge may contribute A/C, where C is an average value of A across the edges. Similarly, the narrow-edge count may have edges that are members to longer concatenated edges contribute more. Thus, for example, the contribution from each edge may be multiplied by A/D, where D is an average of A among edges that are counted in the narrow-edge count.

A group of N vertical (horizontal) edges where, with the exception of the top (leftmost) and the bottom (rightmost) ones, each edge touches two other vertical (horizontal) edges, one above (to the left of) itself, the other below (to the right of) itself, is a vertical (horizontal) concatenated edge of length N. The top (leftmost) edge needs only touch one edge below (to the right of) itself. The bottom (rightmost) edge needs only touch one edge above (to the left of) itself.

FIG. 8 illustrates a vertical concatenated edge and its length. In FIG. 8, cells R2C3 and R2C4 form a first vertical edge, cells R3C3, R3C4, and R3C5 together form a second vertical edge, and cells R4C4 and R4C5 together form a third vertical edge. The first and the third vertical edges each touches only one other vertical edge, whereas the second vertical edge touches two other vertical edges. The first, second and third vertical edges together form a vertical concatenated edge having a length of 3.

In a situation (not shown) where a vertical (horizontal) concatenated edge has two or more branches, i.e. having two edges in a row (column), the length may be defined as the total number of edges within the concatenated edge. Alternately, the length may be defined as the vertical (horizontal) distance from a topmost (leftmost) edge therein to a bottommost (rightmost) edge therein plus one.

There are other possible ways to define a concatenated length other than the above proposals. For example, a definition of a length for a concatenated edge shall have a property that the length is proportional to the number of member edges within the concatenated edge at least up to three. This is to be consistent with the previously stated reasoning that more edges being mutually connected by touching each other exponentially reduces a probability that the concatenated edge is caused by a noise, and as such the length should express a proportionality to the number of member edges within the concatenated edge up to a reasonable number that sufficiently enhances a confidence in the concatenated edge beyond that for a single member. The length filter 212 may de-emphasize or eliminate and thus, broadly speaking, discriminate against an edge having a concatenated length of one. The length filter 212 may discriminate against an edge having a concatenated length of two. The length filter 212 may discriminate against an edge having a concatenated length of three, to further reduce an influence of noise. The length filter 212 may do any one of these actions under a command from the processor.

Although shown in FIG. 3 to immediately follow the Edge Detection & Width Measurement Unit 206, other arrangements are possible. For example, the Length Filter 212 may be inserted before the focus signal calculator 210, wherein the edges processed by the Length Filter 212 are those that pass through the width filter 209 depending on the 'fine' signal.

In an alternate embodiment of a focus signal generator, the fine switch 220 may be removed so that the focus signal calculation unit 210 receives a first set of data not filtered by the width filter 209 and a second set filtered, and for each calculates a different focus signal, gross focus signal for the former, fine focus signal for the latter, and outputs both to the processor 112, 112'.

Width Filter

Figure 11:
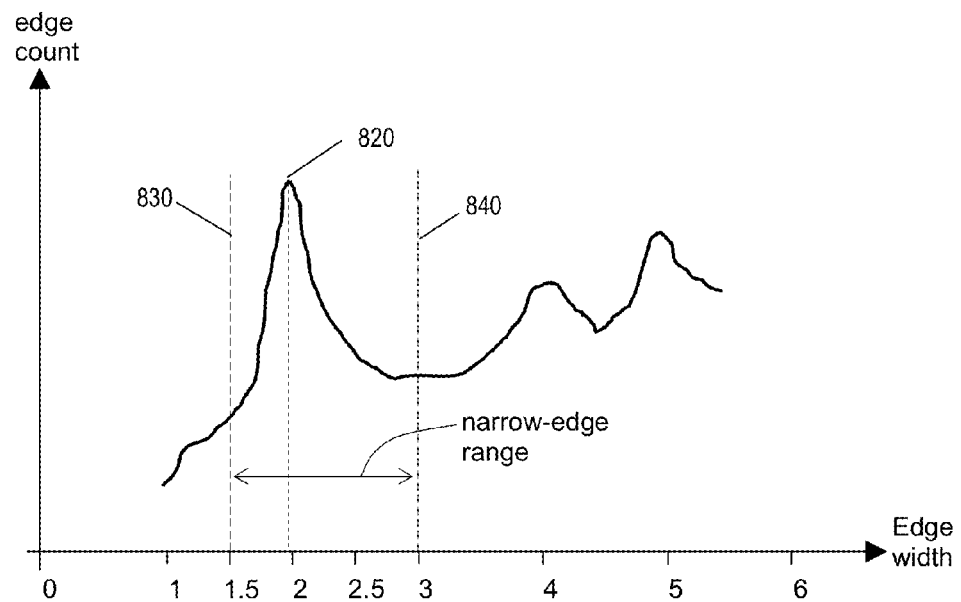
FIG. 11 is a histogram of edge widths illustrating a range of edge widths for calculating a fine focus signal.

Refer next to FIG. 3 to understand an operation of the Width Filter 209. FIG. 11 plots a histogram of edge widths, i.e. a graph of edge counts against edge widths. At edge width of 2, i.e. the aforementioned sharp_edge_width, there is a peak, indicating a presence of sharp edges in the image. At edge widths of 4 and 5, however, there are peaks, indicating edges that are blurred, possibly due to the corresponding imaged objects being out of focus, being at a different distance away from the focus lens than those objects that give rise to the sharp edges. For calculating a focus signal, edges whose widths lie outside a predetermined range ("narrow-edge range") may be de-emphasized using the Width Filter 209. The Width Filter 209 may create a lesser weight for edge widths outside the narrow-edge range for use in the focus signal calculation. For example, edge widths may be assigned weight of 1.0, whereas edges widths more than +1 to the right of the upper limit 840 assigned a weight of 0, and edge widths in between assigned weights between 0 and 1.0, falling monotonically with edge width. Alternately, the Width Filter 209 may prevent such edges from entering the focus signal calculation altogether. Appropriate upper and lower limits 830, 840 depend on several factors, including crosstalk in the pixel array 108, the interpolation method used to generate missing colors for the image received by the focus signal generator 120, and the filter coefficients used in the lowpass filter employed in the Edge Detection and Width Measurement Unit 206. Appropriate upper and lower limits 830, 840 and the parameter sharp_edge_width may be determined for the image pickup apparatus 102, 102' by capturing images of various degrees of sharpness and inspecting the edge width histograms. For example, if a sharp image has a peak at edge width of 2, an appropriate lower and upper limit may be 1.5 and 3, respectively, and the sharp_edge_width may be set to 2.0. The lower and upper limits and sharp_edge_width may be determined as above and provided to the focus signal generator 120, 120', 120" by the processor 112, 112". When 'fine command' is ON, the fine focus signal thus calculated de-emphasizes edge widths outside the narrow-edge range.

In addition, the Width Filter 209 may calculate a total count of the edges whose edge widths fall within the narrow-edge range and output as part of output signals 134. Narrow-Edge Count may be input to and used by the focus system controller (processor 112) to detect a presence of sharp image and/or for initiating tracking.

Focus Signal

Referring next to the focus signal calculator 210 of FIG. 3, the focus signal calculator 210 receives edge widths and outputs a focus signal. The focus signal may be calculated as a weighted average of all the edge widths where the weights are the edge counts for each edge width, viz. focus signal=$\Sigma w_i e_i/\Sigma w_i$, where $e_i$ are the edge widths, $w_i$ are the weights, where here $w_i=c_i$, $c_i$ being the edge count at edge width $e_i$, i being a bin number of a histogram of edge widths. Alternately, the weight at each edge width may be the edge count for the edge width multiplied by the edge width itself, i.e. $w_i=c_i e_i$. In addition, preferences from the Width Filter 209 that are expressed in terms of weights may be further multiplied to each edge width. For example, for weights $\Omega_i$ produced by the Width Filter 209, $\Sigma\Omega_i=1$, focus signal may be calculated as $\Sigma\Omega_i w_i e_i/\Sigma\Omega_i w_i$. If control signal 'fine' is ON and 'exclude' is OFF, the focus signal would be a value very close to the sharp edge width of 2.0 for the example shown in FIG. 11, indicating that among object details within the focus distance range that would produce edge widths between 2.0 and 3.0, most are actually in sharp focus. If control signal 'fine' is OFF and 'exclude' is OFF, the focus signal may be a value close to 5.0, indicating that there are substantial details of the image that are out of focus. Turning ON the fine switch 220 allows the focus signal to respond more to objects slightly blurred while less to those that are completely blurred. When the fine switch 220 is ON, we shall refer to the focus signal as a fine focus signal, whereas when the fine switch 220 is OFF, a gross focus signal. As aforementioned, the emphasis expressed by the Length Filter 212 may be incorporated into the focus signal in one of several ways, such as eliminating an edge that is de-emphasized from entering the focus signal calculation, or reducing a weight of the edge's contribution towards a count $e_i$ of a corresponding edge width bin.

Figure 15:
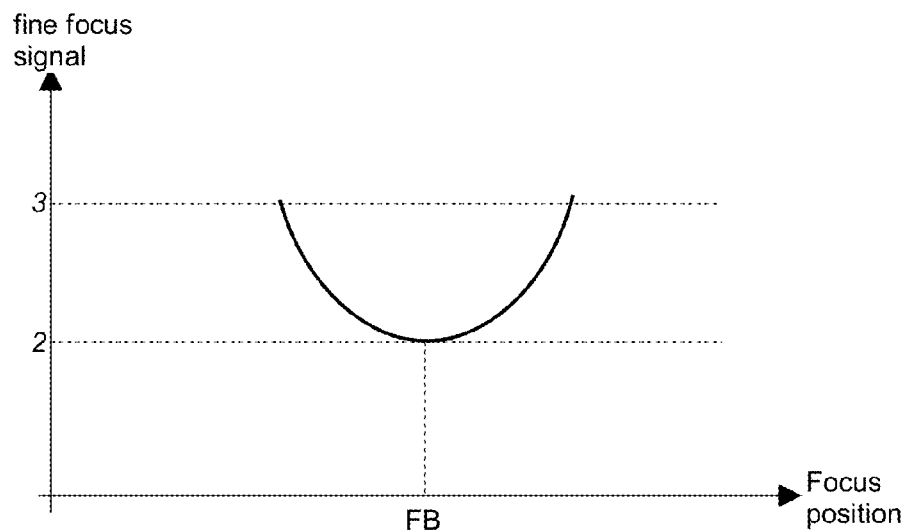
FIG. 15 is a graph illustrating a variation of a fine focus signal across a range of focus positions.

FIG. 15 sketches a response of the fine focus signal to an adjustment of the focus position in the vicinity of where an object is in sharp focus. The fine focus signal reaches a minimum value, approximately at sharp_edge_width, where the focus position brings an image into sharp focus, and increases if otherwise. The fine focus signal may be used for tracking objects already in-focus or very nearly so. For moving objects, the fine focus signal allows the focus control system to keep the objects in sharp focus even if the focus distance continues to change. Fine focus signal may also be used to acquire a sharp focus ("acquisition") of an object that is not yet in sharp focus but close enough such that the object gives rise to edges whose widths fall within the narrow-edge range. Since the edge width histogram exhibits a peak at the edge width corresponding to the object away from the sharp_edge_width, resulting in the fine focus signal being larger than the sharp_edge_width, the focus control system may respond by adjusting the focus position to bring the fine focus signal value towards the sharp_edge_width, thus centering the peak of edge width due to the object at the edge width value equal to sharp_edge_width.

Basic Use

FIGS. 12-16 illustrate how the narrow-edge count, gross focus signal, and fine focus signal may be used to perform focus control to achieve sharp images.

Figure 12:
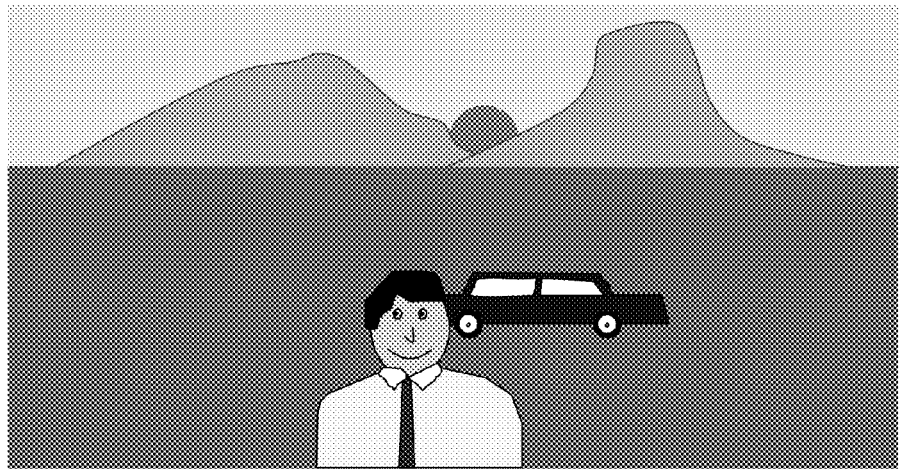
FIG. 12 is an illustration of a scene.

FIG. 12 illustrates an outdoor scene having 3 groups of objects at different focus distances: "person" in the foreground, "mountain, sun, and horizon" in the background, and "car" in the between.

Figure 13:
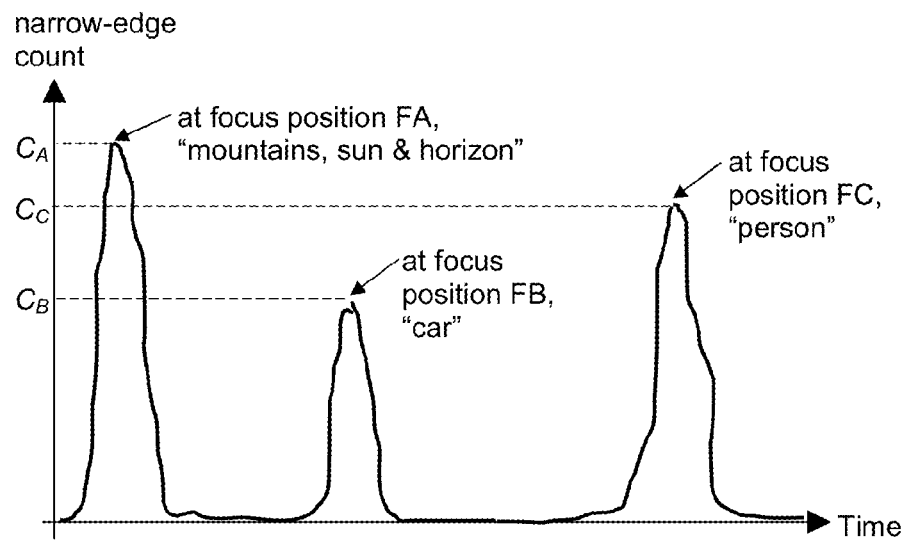
FIG. 13 is a graph illustrating a variation of a narrow-edge count during a focus scan of the scene of FIG. 12.

FIG. 13 is an illustration of the narrow-edge count plotted against time when the focus position of the focus lens 104 sweeps from far to near for the scene illustrated in FIG. 12. The narrow-edge count peaks when the focus position brings an object into a sharp image on the pixel array 108. Thus the narrow-edge count plot exhibits 3 peaks, one each for "mountain, sun, and horizon", "car", and "person", in this order, during the sweep.

Figure 14:
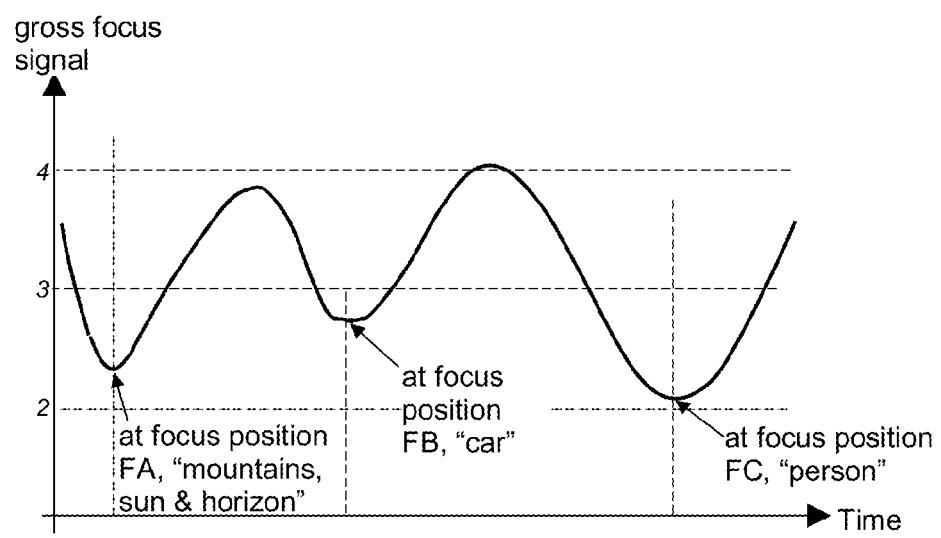
FIG. 14 is a graph illustrating a variation of a gross focus signal during a focus scan of the scene of FIG. 12.

FIG. 14 shows the gross focus signal plotted against time. The gross focus signal exhibits a minimum when the focus position is near each of the 3 focus positions where the narrow-edge count peaks. However, at each minimum, the gross focus signal is not at the sharp edge width level, which is 2.0 in this example, due to bigger edge widths contributed by the other objects that are out-of-focus.

FIG. 15 illustrates the fine focus signal plotted against the focus position in the vicinity of the sharp focus position for "car" in the scene of FIG. 12. The fine focus signal achieves essentially the sharp edge width, which is 2 in this example, despite the presence of blurred objects ("person" and "mountains, sun, and horizon"). Referring to FIG. 11 again, where two peaks at widths of 4 and 5 are contributed by those two groups of blurred objects, this can be understood as the Width Filter 324 having reduced the weight or eliminated altogether the contributions from the edge widths to the right of upper-limit 840.

A focus control system may use the gross focus signal to search for the nearest sharp focus position in a search mode. It can move the focus position away from the current focus position to determine whether the gross focus signal increases or decreases. For example, if the gross focus signal increases (decreases) when the focus position moves inwards (outwards), there is a sharp focus position farther from the current focus position. The processor 112, 112', 112" can then provide a focus drive signal to move the focus lens 104 in the direction towards the adjacent sharp focus position.

A focus control system may use the fine focus signal to track an object already in sharp focus to maintain the corresponding image sharp (thus a "tracking mode") despite changes in the scene, movement of the object, or movement of the image pickup apparatus. When an object is in sharp focus, the fine focus signal level is stable despite such changes. Hence a change in the fine focus signal suggests a change in focus distance of the object from the image pickup apparatus. By "locking" the focus control system to a given fine focus signal level near the minimum, for example between 2.0 to 2.5 in this example, in particular 2.1, any shift in the fine focus signal level immediately informs the processor 112, 112', 112" of a change in the focus distance of the object. The processor 112, 112', 112" can then determine a direction and cause the focus lens 104 to move to bring the fine focus signal level back to the "locked" level. Thus the image pickup apparatus 102, 103, 103', 103" is able to track a moving object.

A focus control system, e.g. as implemented in algorithm in processor 112, 112', 112", may use narrow-edge count to trigger a change from a search mode to a tracking mode. In the tracking mode, the focus control system uses the fine focus signal to "lock" the object. Before the focus position is sufficiently near the sharp focus position for the object, the focus control system may use the gross focus signal to identify the direction to move and regulate the speed of movement of the lens. When a object is coming into sharp focus, narrow-edge count peaks sharply. The processor 112, 112', 112" may switch into the tracking mode and use the fine focus signal for focus position control upon detection of a sharp rise in the narrow-edge count or a peaking or both. A threshold, which may be different for each different sharp focus position, may be assigned to each group of objects found from an end-to-end focus position "scan", and subsequently when the narrow-edge count surpasses this threshold the corresponding group of objects is detected. For a stationary scene, e.g. for still image taking, an end-to-end focus position scan can return a list of maximum counts, one maximum count for each peaking of the narrow-edge count. A list of thresholds may be generated from the list of maximum counts, for example by taking 50% of the maximum counts.

Figure 16:
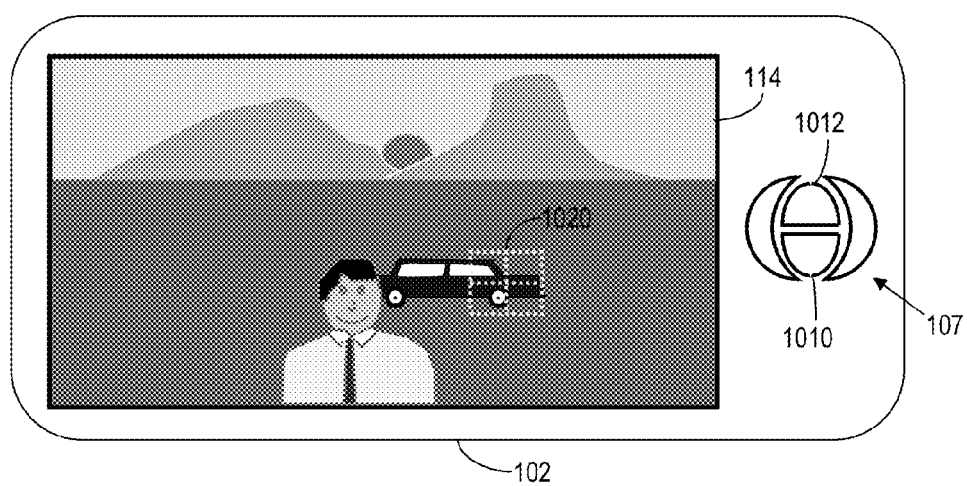
FIG. 16 is an illustration of an apparatus displaying multiple objects in a scene and a selection mark over one of the objects.

FIG. 16 illustrates an image pickup apparatus 102 having a display 114, an input device 107 comprising buttons, and selection marker 1920 highlighted in the display 114. A user can create, shape and maneuver the selection marker 1920 using input device 107. Although shown in this example to comprise buttons, input device 107 may comprise a touch-screen overlaying the display 114 to detect positions of touches or strokes on the display 114. Input device 107 and processor 112, 112', 112" or a separate dedicated controller (not shown) for the input device 107 may determine the selection region. The parameters for describing the selection region may be transmitted to the focus signal generator 120, 120', 120" over bus 132 (or internally within the processor 112 in the case where focus signal generator 120 is part of the processor 112). In response, the focus signal generator 120 may limit the focus signal calculation or the narrow-edge count or both to edges within the selection region described by said parameters or de-emphasize edges outside the selection region. Doing so can de-emphasize unintended objects from the focus signal and then even the gross focus signal will exhibit a single minimum and a minimum level within 1.0 or less of the sharp edge width.

Alternate Embodiments

Figure 17:
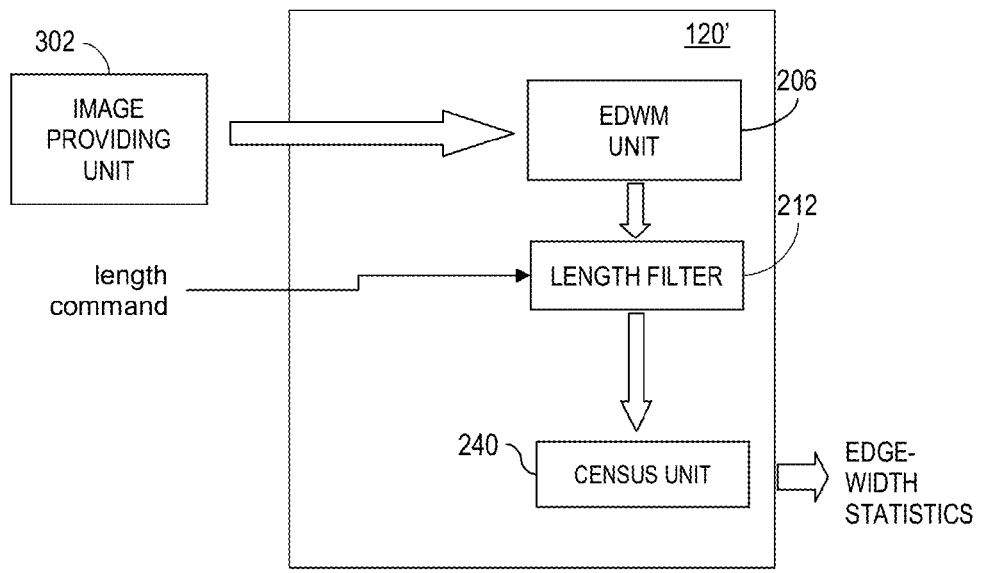
FIG. 17 is a block diagram of an alternate embodiment of a focus signal generator.

FIG. 17 shows an alternate embodiment of a focus signal generator 120'. Focus signal generator 120' outputs statistics of edges and edge widths. Among the edge-width statistics that controller 120' outputs may be one or more of the following: an edge-width histogram comprising edge counts at different edge widths; an edge width where edge width count reaches maximum; a set of coefficients representing a spline function that approximates edge counts at different edge widths; and any data that can represent a function of edge width. Census Unit 240 may receive data computed in one or more of the other units with the focus signal generator 120' to calculate statistics of edge widths. In general, the focus signal generator 120' may output a signal that has an indication of a distribution of edge widths.

Figure 18:
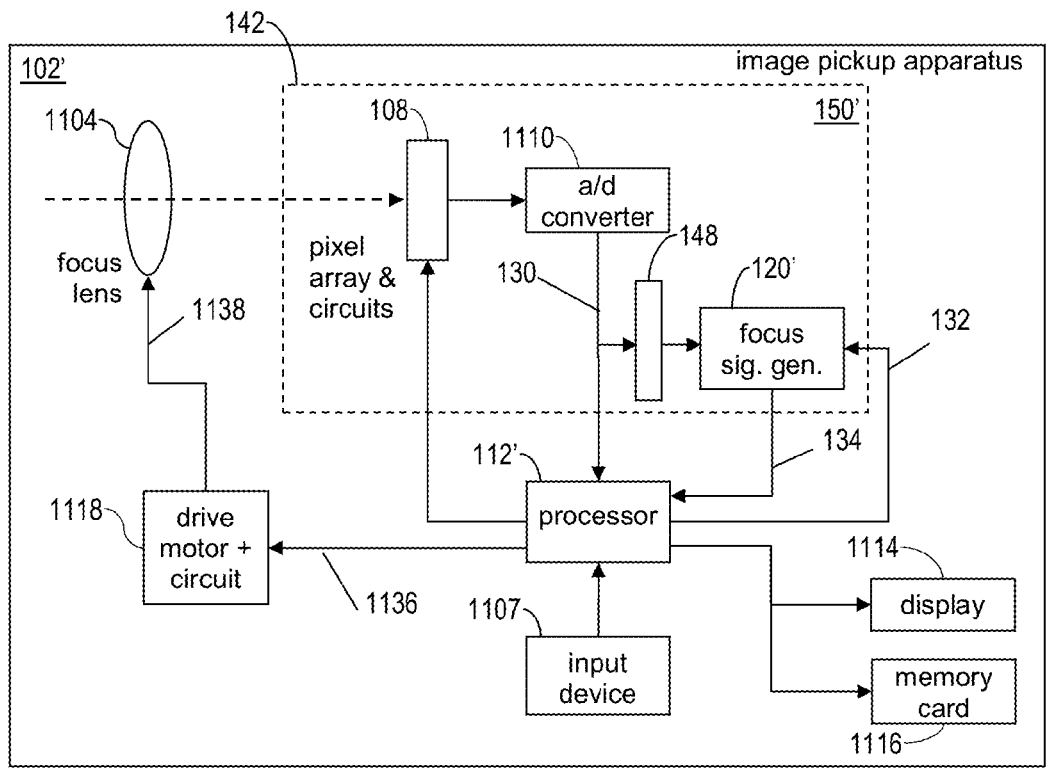
FIG. 18 is a schematic of an alternate embodiment of an auto-focus image pickup apparatus.

Referring to FIG. 18, the edge-width statistics thus provided in signals 134 to an alternative embodiment of processor 112' in an alternative auto-focus image pickup apparatus 102' may be used by the processor 112' to compute a gross and/or fine focus signal and a narrow-edge count in accordance with methods discussed above or equivalent thereof. In addition, any data computed in the focus signal generator 120' may be output to the processor 112' as part of the output signals 134.

The processor 112' may internally generate a focus signal and/or a narrow-edge count in addition to the functions included in the processor 112 of FIG. 1.

The pixel array 108, A/D Converter 110, color interpolator 148, and generator 120' may reside within a package 142, together comprising an image sensor 150', separate from the processor 112'.

Auxiliary Pixel Array

Figure 19:
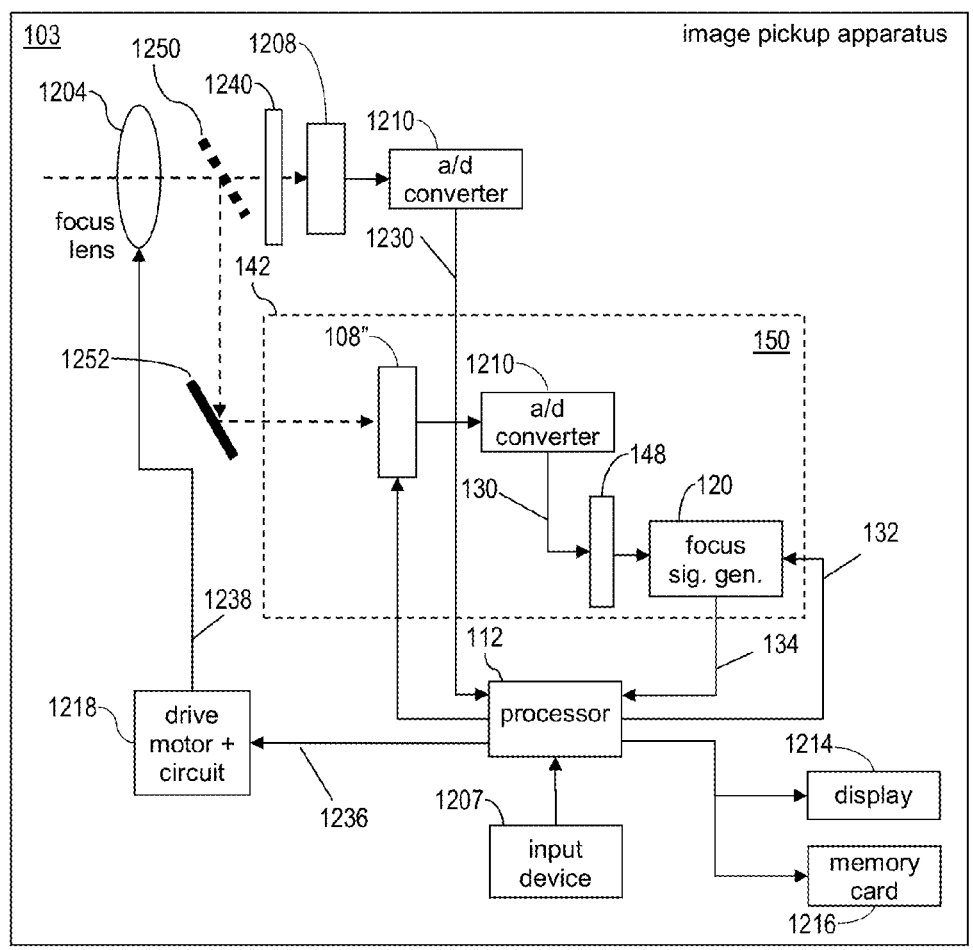
FIG. 19 is a schematic of an embodiment of an auto-focus image pickup apparatus having a main pixel array and an auxiliary pixel array.

FIG. 19 shows an alternate embodiment of an auto-focus image pickup system 103. In addition to elements included in a system 102, the system 103 may include a partial mirror 2850, a full mirror 2852, an optical lowpass filter 2840, a main pixel array 2808, and a main A/D Converter 2810. The partial mirror 2850 may split the incoming light beam into a first split beam and a second split beam, one transmitted, the other reflected. The first split beam may further pass through the optical lowpass filter 2840 before finally reaching the main pixel array 2808, which detects the first split beam and converts to analog signals. The second split beam may be reflected by the full mirror 2852 before finally reaching the auxiliary pixel array 108", which corresponds to the pixel array 108 in system 102 shown in FIG. 1. The ratio of light intensity of the first beam to the second beam may be 1-to-1 or greater than 1-to-1. For example, the ratio may be 4-to-1.

The main pixel array 2808 may be covered by a color filter array of a color mosaic pattern, e.g. the Bayer pattern. The optical lowpass filter 2808 prevents the smallest light spot focused on the pixel array 2808 from being too small as to cause aliasing. Where a color filter of a mosaic pattern covers the pixel array 2808, aliasing can give rise to color moiré artifacts after a color interpolation,. For example, the smallest diameter of a circle encircling 84% of the visible light power of a light spot on the main pixel array 2808 ("smallest main diameter") may be kept larger than one and a half pixel width but less than two pixel widths by use of the optical lowpass filter. For example, if the main pixel array 2808 has a pixel width of 4.5 um, whereas the smallest diameter is 2.0 um without optical lowpass filtering, the optical lowpass filter 2840 may be selected to make the light spot 6.7 um or larger in diameter.

The auxiliary pixel array 108" may comprise one or more arrays of photodetectors. Each of the arrays may or may not be covered by a color filter array of a color mosaic pattern. The array(s) in auxiliary pixel array 108" outputs image(s) in analog signals that are converted to digital signals 130 by A/D Converter 110. The images are sent to the focus signal generator 120. A color interpolator 148 may generate the missing colors for images generated from pixels covered by color filters. If auxiliary pixel array 108" comprises multiple arrays of photodetectors, each array may capture a sub-image that corresponds to a portion of the image captured by the main pixel array 2808. The multiple arrays may be physically apart by more than a hundred pixel widths, and may or may not share a semiconductor substrate. Where the pixel arrays within auxiliary pixel array 108" do not share a semiconductor substrate, they may be housed together in a package (not shown).

Main A/D Converter 2810 converts analog signals from the Main Pixel Array 2808 into digital main image data signal 2830, which is sent to the processor 112, where the image captured on the Main Pixel Array 2808 may receive image processing such as color interpolation, color correction, and image compression/decompression and finally be stored in memory card 116.

An array of photodetectors in the auxiliary pixel array 108" may have a pixel width ("auxiliary pixel width") that is smaller than a pixel width of the main pixel array 2808 ("main pixel width"). The auxiliary pixel width may be as small as half of the main pixel width. If an auxiliary pixel is covered by a color filter and the auxiliary pixel width is less than 1.3 times the smallest spot of visible light without optical lowpass filtering, a second optical lowpass filter may be inserted in front of the auxiliary array 108" to increase the smallest diameter on the auxiliary pixel array 108" ("smallest auxiliary diameter") to between 1.3 to 2 times as large but still smaller than the smallest main diameter, preferably 1.5. The slight moiré in the auxiliary image is not an issue as the auxiliary image is not presented to the user as the final captured image.

Figure 22:
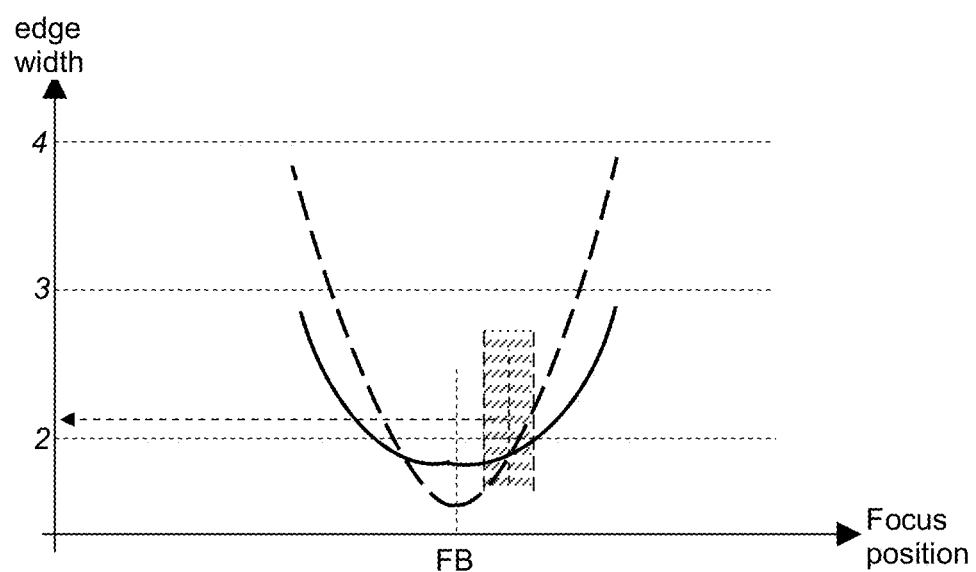
FIG. 22 is an illustration of a variation of an edge width from a main pixel array and a variation of an edge width from an auxiliary pixel array at different focus positions.

FIG. 22 illustrates how edge widths may vary about a sharp focus position for main images from the main pixel array 2808 (solid curve) and auxiliary images from the auxiliary pixel array 108" (dashed curve). The auxiliary images give sharper slopes even as the main images reach the targeted sharp edge width of 2. The auxiliary image is permitted to reach below the targeted sharp edge width, since moiré due to aliasing is not as critical in the auxiliary image, as it is not presented to the user as a final image. This helps to sharpen the slope below and above the sharp edge width. The sharper slope is also helped by the auxiliary pixel width being smaller than the main pixel width.

The shaded region in FIG. 22 indicates a good region within which to control the focus position to keep the main image in sharp focus. A change in focus position outwards will cause the edge width to increase in the auxiliary image, whereas a change inwards will cause the it to decrease. To maintain the main image's edge widths near the sharp edge width, a linear feedback control system may be employed to target the middle auxiliary edge width value within the shade region and to use as feedback signal the edge widths generated from the auxiliary images.

The auxiliary pixel array 108", A/D Converter 110, focus signal generator 120 together may be housed in a package 142 and constitute an auxiliary sensor 150. The auxiliary sensor 150 may further comprise a color interpolator 148.

Figure 20:
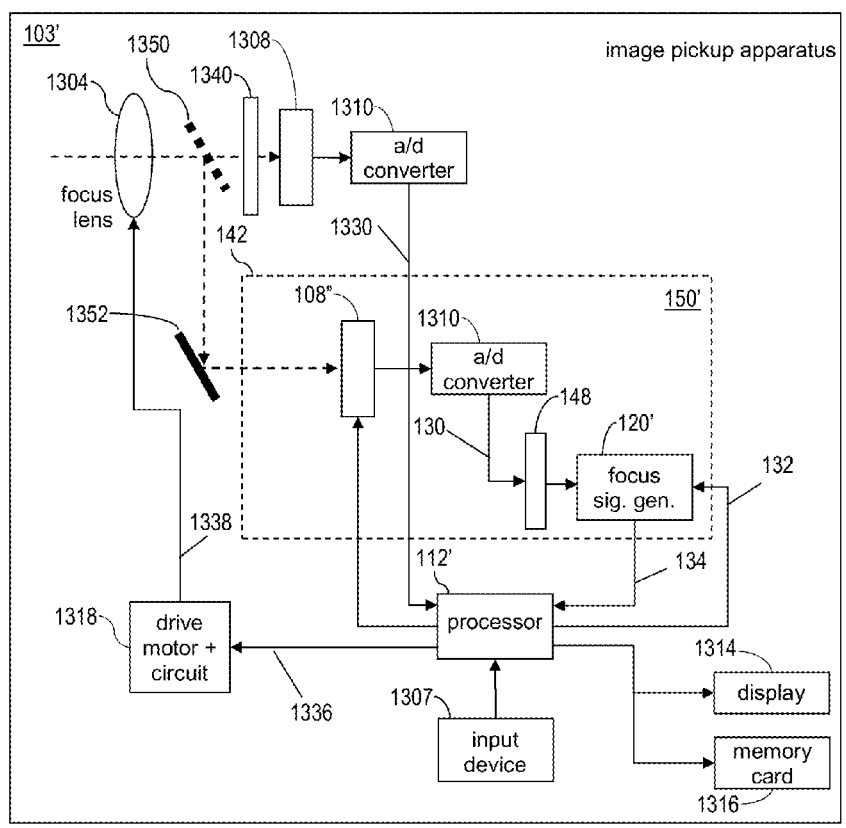
FIG. 20 is a schematic of an alternate embodiment of an auto-focus image pickup apparatus having a main pixel array and an auxiliary pixel array.

FIG. 20 shows an alternative embodiment of auto-focus image pickup apparatus 103' similar to apparatus 103 except focus signal generator 120' replaces focus signal generator 120. The auxiliary pixel array 108", A/D Converter 110, focus signal generator 120' together may be housed in a package 142 and constitute an auxiliary sensor 150'. The auxiliary sensor 150 may further comprise a color interpolator 148.

Figure 21:
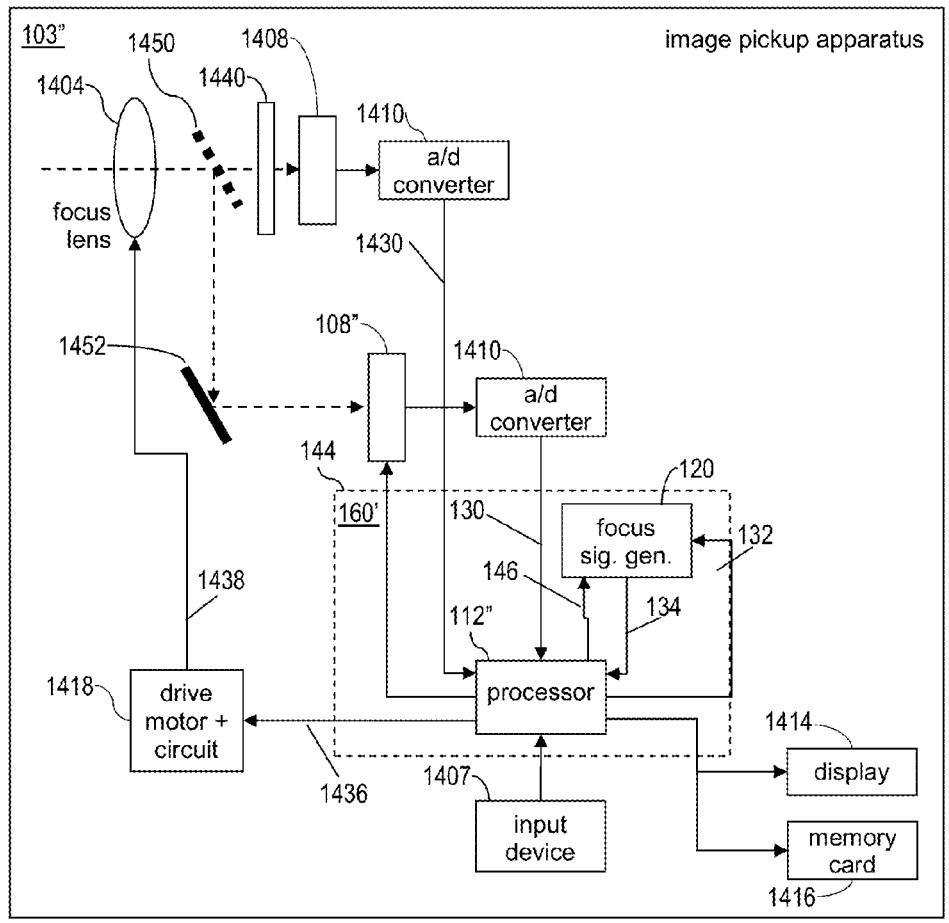
FIG. 21 is a schematic of an alternate embodiment of an auto-focus image pickup apparatus having a main pixel array and an auxiliary pixel array.

FIG. 21 shows an alternate embodiment of auto-focus image pickup apparatus 103". The focus signal generator 120 and the processor 112" may be housed in a package 144 as a camera controller, separate from the auxiliary pixel array 108". The processor 112" is similar to processor 112 except that processor 112" receives images from the main pixel array 2808 as well as the auxiliary pixel array 108". The processor 112" may perform a color interpolation, a color correction, a compression/decompression, and a storing to memory card 116 for the images received on signal 2830 similar to the processing that the processor 112 may perform on signal 130 in FIG. 2. Unlike in FIG. 2, here the images received on signal 130 need not receive compression/decompression and storing to memory card 116. The processor 112" may perform color interpolation on images received on signal 130 for pixels that are covered by color filters in the auxiliary pixel array 108" and send the color interpolated images to the focus signal generator 120 on signal 146.

The auto-focus image pickup system 102, 102', 103, 103', 103" may include a computer program storage medium (not shown) that comprises instructions that causes the processor 112, 112', 112" respectively, and/or the focus signal generator 120, 120' to perform one or more of the functions described herein. By way of example, the instructions may cause the processor 112 or the generator 120' to perform a slant correction for an edge width in accordance with the flowchart of FIG. 7. As another example, the instructions may cause the processor 112' or the generator 120 to perform an edge width filtering in accordance with the above description for Width Filter 209. Alternately, the processor 112, 112' or the generator 120, 120' may be configured to have a combination of firmware and hardware, or a pure hardware implementation for one or more of the functions contained therein. For example, in generator 120, a slant correction may be performed in pure hardware and a length filter 212 performed according to instructions in a firmware.

Figure 30:
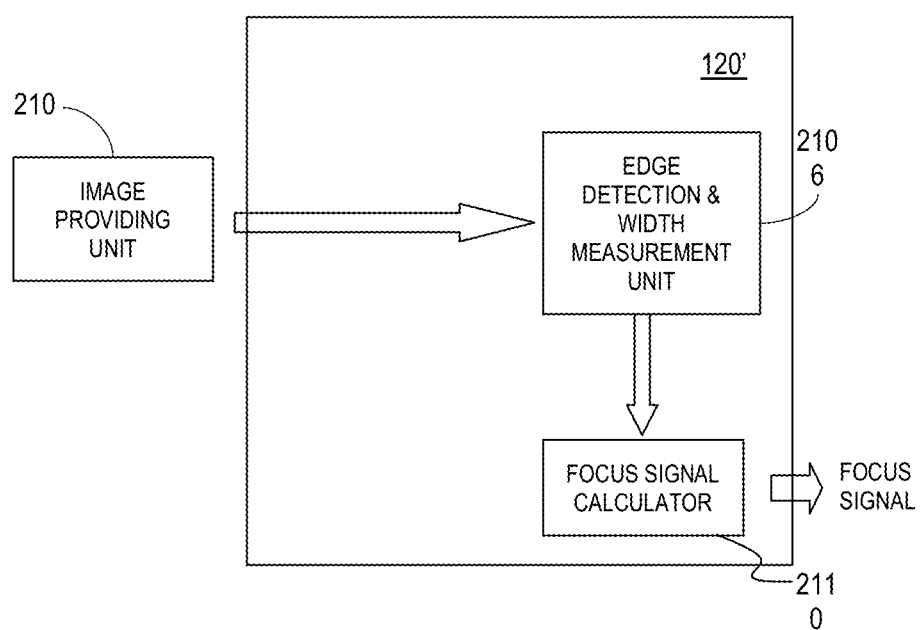
FIG. 30 shows an alternate embodiment of a focus signal generator.

FIG. 30 shows yet another embodiment of focus signal generator 120'. This embodiment may be employed in any of the above image capture systems.

While a memory card 116 is shown as part of system 102, any nonvolatile storage medium may be used instead, e.g. hard disk drive, wherein images stored therein are accessible by a user and may be copied to a different location outside and away from the system 102.

One or more parameters for use in the system, for instance the sharp_edge_width, may be stored in a non-volatile memory in a device within the system. The device may be a flash memory device, the processor, or the image sensor, or the focus signal generator as a separate device from those. One or more formulae for use in the system, for example for calculating the concatenated length threshold, or for calculating beta may likewise be stored as parameters or as computer-executable instructions in a non-volatile memory in one or more of those devices.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. An auto-focus image capture system, comprising:
a focus lens;
a pixel array that detects light from the focus lens;
a drive motor coupled to control the focus lens to bring images of objects into sharp focus on the pixel array; and,
a focus signal generator circuit coupled to the pixel array, wherein the focus signal generator generates a focus signal from a plurality of edges of an image captured on the pixel array to indicate a degree of image sharpness,
wherein the focus signal generator detects a lack of symmetry about a peak in a gradient profile of an edge to de-emphasize or eliminate altogether the edge from influencing control of the focus lens.

2. The auto-focus image capture system of claim 1, wherein the lack of symmetry is detected from a quantity that indicates a degree of reflection asymmetry in a sequence of gradients across the edge having a value exceeding an asymmetry threshold or lying outside a predetermined tolerance region.

3. The auto-focus image capture system of claim 1, wherein the lack of symmetry is detected from a distance from a midpoint of a pair of positive and negative peaks of a sequence of second-order derivatives across the edge to an interpolated position of zero-crossing of the sequence of second-order derivatives.

4. The auto-focus image capture system of claim 1, wherein the lack of symmetry is detected from a center-to-center distance between a first narrowest undivided portion of the edge that has a first contrast and a second narrowest undivided portion of the edge that has a second contrast.

\* \* \* \* \*